(12) United States Patent
Thirumalai et al.

(10) Patent No.: US 9,224,168 B2
(45) Date of Patent: Dec. 29, 2015

(54) TUNING PRODUCT POLICY USING OBSERVED EVIDENCE OF CUSTOMER BEHAVIOR

(71) Applicant: Microsoft Corporation, Redmond, WA (US)

(72) Inventors: Gokul P. Thirumalai, Bellevue, WA (US); Isaac P. Ahdout, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/711,549

(22) Filed: Dec. 11, 2012

(65) Prior Publication Data
US 2013/0173442 A1 Jul. 4, 2013

Related U.S. Application Data

(60) Division of application No. 11/224,635, filed on Sep. 12, 2005, now Pat. No. 8,336,085, which is a continuation-in-part of application No. 11/152,214, filed on Jun. 14, 2005, now Pat. No. 8,176,564, which (Continued)

(51) Int. Cl.
*H04L 29/06* (2006.01)
*G06F 21/00* (2013.01)
*G06Q 40/00* (2012.01)
*G06Q 30/04* (2012.01)
*G06Q 30/06* (2012.01)
*G06Q 40/02* (2012.01)

(52) U.S. Cl.
CPC ............... *G06Q 40/00* (2013.01); *G06Q 30/04* (2013.01); *G06Q 30/06* (2013.01); *G06Q 40/02* (2013.01)

(58) Field of Classification Search
CPC ....... G06Q 40/00; G06Q 30/06; G06Q 30/04; G06Q 40/02
USPC .......................................................... 726/1
See application file for complete search history.

(56) References Cited

U.S. PATENT DOCUMENTS 3,718,906 A  2/1973  Lightner
4,183,085 A  1/1980  Roberts et al.
(Continued)

FOREIGN PATENT DOCUMENTS

CN  1531673     9/2004
EP  0265183 A2  4/1988
(Continued)

OTHER PUBLICATIONS

"International Search Report and Written Opinion mailed Jun. 18, 2008", Application Serial No. PCT/US05/40940, 18 pages.
(Continued)

*Primary Examiner* — Lisa Lewis
(74) *Attorney, Agent, or Firm* — Sandy Swain; Micky Minhas

(57) ABSTRACT

A computer adapted for pay-as-you go or other metered use has a policy for determined what measurements to take to detect fraud as well as steps to take when fraud is found. To optimize between good performance and sufficient tests to reduce the risk of fraud, a policy is developed based on observation of the users behavior, using data taken at the computer, data from a payment processor or both. After analysis, an updated policy is securely loaded at the computer to determine what, and how often to measure for suspected fraud.

21 Claims, 4 Drawing Sheets

Related U.S. Application Data is a continuation-in-part of application No. 11/022,493, filed on Dec. 22, 2004, now Pat. No. 8,464,348, which is a continuation-in-part of application No. 11/006,837, filed on Dec. 8, 2004, now abandoned, which is a continuation-in-part of application No. 10/989,122, filed on Nov. 15, 2004, now Pat. No. 7,610,631.

(56) References Cited

U.S. PATENT DOCUMENTS

| | | |
|---|---|---|
| 4,323,921 A | 4/1982 | Guillou |
| 4,481,583 A | 11/1984 | Mueller |
| 4,528,643 A | 7/1985 | Freeny, Jr. |
| 4,529,870 A | 7/1985 | Chaum |
| 4,558,176 A | 12/1985 | Arnold et al. |
| 4,620,150 A | 10/1986 | Germer et al. |
| 4,658,093 A | 4/1987 | Hellman |
| 4,683,553 A | 7/1987 | Mollier |
| 4,750,034 A | 6/1988 | Lem |
| 4,817,094 A | 3/1989 | Lebizay et al. |
| 4,827,508 A | 5/1989 | Shear |
| 4,855,730 A | 8/1989 | Venners et al. |
| 4,855,922 A | 8/1989 | Huddleston et al. |
| 4,857,999 A | 8/1989 | Welsh |
| 4,910,692 A | 3/1990 | Outram |
| 4,916,738 A | 4/1990 | Chandra et al. |
| 4,926,479 A | 5/1990 | Goldwasser et al. |
| 4,953,209 A | 8/1990 | Ryder, Sr. et al. |
| 4,959,774 A | 9/1990 | Davis |
| 4,967,273 A | 10/1990 | Greenberg |
| 4,977,594 A | 12/1990 | Shear |
| 5,001,752 A | 3/1991 | Fischer |
| 5,012,514 A | 4/1991 | Renton |
| 5,023,907 A | 6/1991 | Johnson et al. |
| 5,047,928 A | 9/1991 | Wiedemer |
| 5,050,213 A | 9/1991 | Shear |
| 5,103,392 A | 4/1992 | Mori |
| 5,103,476 A | 4/1992 | Waite et al. |
| 5,109,413 A | 4/1992 | Comerford et al. |
| 5,117,457 A | 5/1992 | Comerford et al. |
| 5,150,420 A | 9/1992 | Haraguchi |
| 5,193,573 A | 3/1993 | Chronister |
| 5,204,897 A | 4/1993 | Wyman |
| 5,222,134 A | 6/1993 | Waite et al. |
| 5,249,184 A | 9/1993 | Woest et al. |
| 5,261,002 A | 11/1993 | Perlman et al. |
| 5,269,019 A | 12/1993 | Peterson et al. |
| 5,274,368 A | 12/1993 | Breeden et al. |
| 5,301,268 A | 4/1994 | Takeda |
| 5,303,370 A | 4/1994 | Brosh et al. |
| 5,319,705 A | 6/1994 | Halter et al. |
| 5,355,161 A | 10/1994 | Bird et al. |
| 5,369,262 A | 11/1994 | Dvorkis et al. |
| 5,406,630 A | 4/1995 | Piosenka et al. |
| 5,410,598 A | 4/1995 | Shear et al. |
| 5,414,861 A | 5/1995 | Horning |
| 5,437,040 A | 7/1995 | Campbell |
| 5,442,704 A | 8/1995 | Holtey |
| 5,444,780 A | 8/1995 | Hartman, Jr. |
| 5,448,045 A | 9/1995 | Clark |
| 5,457,699 A | 10/1995 | Bode et al. |
| 5,459,867 A | 10/1995 | Adams et al. |
| 5,462,660 A | 10/1995 | Singleton et al. |
| 5,469,506 A | 11/1995 | Berson et al. |
| 5,473,692 A | 12/1995 | Davis |
| 5,490,216 A | 2/1996 | Richardson, III |
| 5,500,897 A | 3/1996 | Hartman, Jr. |
| 5,509,070 A | 4/1996 | Schull |
| 5,513,319 A | 4/1996 | Finch et al. |
| 5,522,040 A | 5/1996 | Hofsass et al. |
| 5,530,846 A | 6/1996 | Strong |
| 5,535,276 A | 7/1996 | Ganesan |
| 5,552,776 A | 9/1996 | Wade et al. |
| 5,553,143 A | 9/1996 | Ross et al. |
| 5,557,765 A | 9/1996 | Lipner et al. |
| 5,563,799 A | 10/1996 | Brehmer et al. |
| 5,568,552 A | 10/1996 | Davis |
| 5,586,291 A | 12/1996 | Lasker et al. |
| 5,629,980 A | 5/1997 | Stefik et al. |
| 5,634,012 A | 5/1997 | Stefik et al. |
| 5,636,292 A | 6/1997 | Rhoads |
| 5,638,443 A | 6/1997 | Stefik et al. |
| 5,638,513 A | 6/1997 | Ananda |
| 5,648,906 A * | 7/1997 | Amirpanahi ............... 705/418 |
| 5,671,412 A | 9/1997 | Christiano |
| 5,673,316 A | 9/1997 | Auerbach et al. |
| 5,689,565 A | 11/1997 | Spies et al. |
| 5,708,709 A | 1/1998 | Rose |
| 5,710,706 A | 1/1998 | Markl et al. |
| 5,710,887 A | 1/1998 | Chelliah et al. |
| 5,715,403 A | 2/1998 | Stefik |
| 5,721,788 A | 2/1998 | Powell et al. |
| 5,724,425 A | 3/1998 | Chang et al. |
| 5,745,573 A | 4/1998 | Lipner et al. |
| 5,745,879 A | 4/1998 | Wyman |
| 5,754,657 A | 5/1998 | Schipper et al. |
| 5,754,763 A | 5/1998 | Bereiter |
| 5,757,908 A | 5/1998 | Cooper et al. |
| 5,758,068 A | 5/1998 | Brandt et al. |
| 5,763,832 A | 6/1998 | Anselm |
| 5,765,152 A | 6/1998 | Erickson |
| 5,768,382 A | 6/1998 | Schneier et al. |
| 5,771,354 A | 6/1998 | Crawford |
| 5,774,870 A | 6/1998 | Storey |
| 5,778,395 A | 7/1998 | Whiting et al. |
| 5,790,664 A | 8/1998 | Coley et al. |
| 5,793,839 A | 8/1998 | Farris et al. |
| 5,799,088 A | 8/1998 | Raike |
| 5,802,592 A | 9/1998 | Chess |
| 5,809,144 A | 9/1998 | Sirbu et al. |
| 5,825,876 A | 10/1998 | Peterson, Jr. |
| 5,825,877 A | 10/1998 | Dan et al. |
| 5,825,883 A | 10/1998 | Archibald et al. |
| 5,841,865 A | 11/1998 | Sudia |
| 5,844,986 A | 12/1998 | Davis |
| 5,845,065 A | 12/1998 | Conte et al. |
| 5,845,281 A | 12/1998 | Benson et al. |
| 5,864,620 A | 1/1999 | Pettitt |
| 5,872,846 A | 2/1999 | Ichikawa |
| 5,875,236 A | 2/1999 | Jankowitz et al. |
| 5,881,144 A | 3/1999 | Havens |
| 5,883,670 A | 3/1999 | Sporer et al. |
| 5,883,958 A | 3/1999 | Ishiguro et al. |
| 5,892,900 A | 4/1999 | Ginter et al. |
| 5,892,906 A | 4/1999 | Chou et al. |
| 5,893,086 A | 4/1999 | Schmuck et al. |
| 5,905,799 A | 5/1999 | Ganesan |
| 5,910,987 A | 6/1999 | Ginter et al. |
| 5,917,912 A | 6/1999 | Ginter et al. |
| 5,925,127 A | 7/1999 | Ahmad |
| 5,943,248 A | 8/1999 | Clapp |
| 5,943,422 A | 8/1999 | Van Wie et al. |
| 5,948,061 A | 9/1999 | Merriman |
| 5,949,876 A | 9/1999 | Ginter et al. |
| 5,949,877 A | 9/1999 | Traw et al. |
| 5,951,642 A | 9/1999 | Onoe et al. |
| 5,953,502 A | 9/1999 | Helbig et al. |
| 5,956,408 A | 9/1999 | Arnold |
| 5,982,891 A | 11/1999 | Ginter et al. |
| 5,983,238 A | 11/1999 | Becker et al. |
| 5,991,406 A | 11/1999 | Lipner et al. |
| 5,994,710 A | 11/1999 | Knee et al. |
| 5,995,625 A | 11/1999 | Sudia et al. |
| 6,005,945 A | 12/1999 | Whitehouse |
| 6,009,177 A | 12/1999 | Sudia |
| 6,012,487 A | 1/2000 | Hauck |
| 6,021,438 A | 2/2000 | Duvvoori |
| 6,023,510 A | 2/2000 | Epstein |
| 6,026,293 A | 2/2000 | Osborn |
| 6,049,789 A | 4/2000 | Frison et al. |
| 6,049,878 A | 4/2000 | Caronni et al. |
| 6,058,188 A | 5/2000 | Chandersekaran et al. |

(56) References Cited

U.S. PATENT DOCUMENTS

| | | |
|---|---|---|
| 6,058,476 A | 5/2000 | Matsuzaki et al. |
| 6,061,794 A | 5/2000 | Angelo et al. |
| 6,072,874 A | 6/2000 | Shin et al. |
| 6,073,124 A | 6/2000 | Krishnan et al. |
| 6,078,909 A | 6/2000 | Knutson |
| 6,085,976 A | 7/2000 | Sehr |
| 6,101,606 A | 8/2000 | Diersch et al. |
| 6,105,069 A | 8/2000 | Franklin et al. |
| 6,112,181 A | 8/2000 | Shear et al. |
| 6,115,712 A | 9/2000 | Islam et al. |
| 6,119,229 A | 9/2000 | Martinez et al. |
| 6,122,741 A | 9/2000 | Patterson et al. |
| 6,131,162 A | 10/2000 | Yoshiura et al. |
| 6,141,754 A | 10/2000 | Choy |
| 6,147,773 A | 11/2000 | Taylor |
| 6,148,417 A | 11/2000 | Da Silva |
| 6,151,676 A | 11/2000 | Cuccia et al. |
| 6,158,657 A | 12/2000 | Hall, III et al. |
| 6,163,512 A | 12/2000 | Jenn |
| 6,175,825 B1 | 1/2001 | Fruechtel |
| 6,185,678 B1 | 2/2001 | Arbaugh et al. |
| 6,188,995 B1 | 2/2001 | Garst et al. |
| 6,189,146 B1 | 2/2001 | Misra et al. |
| 6,192,392 B1 | 2/2001 | Ginter |
| 6,199,068 B1 | 3/2001 | Carpenter |
| 6,212,634 B1 | 4/2001 | Geer, Jr. et al. |
| 6,219,652 B1 | 4/2001 | Carter et al. |
| 6,219,788 B1 | 4/2001 | Flavin et al. |
| 6,223,291 B1 | 4/2001 | Puhl |
| 6,226,618 B1 | 5/2001 | Downs et al. |
| 6,226,747 B1 | 5/2001 | Larsson et al. |
| 6,230,185 B1 | 5/2001 | Salas et al. |
| 6,233,600 B1 | 5/2001 | Salas et al. |
| 6,233,685 B1 | 5/2001 | Smith |
| 6,243,439 B1 | 6/2001 | Arai et al. |
| 6,243,470 B1 | 6/2001 | Coppersmith et al. |
| 6,243,692 B1 | 6/2001 | Floyd et al. |
| 6,253,193 B1 | 6/2001 | Ginter et al. |
| 6,253,224 B1 | 6/2001 | Brice, Jr. et al. |
| 6,260,141 B1 | 7/2001 | Park |
| 6,263,313 B1 | 7/2001 | Milsted et al. |
| 6,263,431 B1 | 7/2001 | Lovelace et al. |
| 6,269,456 B1 | 7/2001 | Hodges et al. |
| 6,272,469 B1 | 8/2001 | Koritzinsky et al. |
| 6,279,111 B1 | 8/2001 | Jensenworth et al. |
| 6,279,156 B1 | 8/2001 | Amberg et al. |
| 6,286,051 B1 | 9/2001 | Becker et al. |
| 6,289,319 B1 | 9/2001 | Lockwood |
| 6,289,452 B1 | 9/2001 | Arnold et al. |
| 6,295,577 B1 | 9/2001 | Anderson et al. |
| 6,298,446 B1 | 10/2001 | Schreiber et al. |
| 6,303,924 B1 | 10/2001 | Adan et al. |
| 6,304,915 B1 | 10/2001 | Nguyen et al. |
| 6,314,408 B1 | 11/2001 | Salas et al. |
| 6,314,409 B2 | 11/2001 | Schneck et al. |
| 6,321,335 B1 | 11/2001 | Chu |
| 6,327,652 B1 | 12/2001 | England et al. |
| 6,330,670 B1 | 12/2001 | England et al. |
| 6,334,189 B1 | 12/2001 | Granger et al. |
| 6,335,972 B1 | 1/2002 | Chandersekaran et al. |
| 6,343,280 B2 | 1/2002 | Clark |
| 6,345,256 B1 | 2/2002 | Milsted et al. |
| 6,345,294 B1 | 2/2002 | O'Toole et al. |
| 6,363,488 B1 | 3/2002 | Ginter et al. |
| 6,367,017 B1 | 4/2002 | Gray |
| 6,373,047 B1 | 4/2002 | Adan et al. |
| 6,374,357 B1 | 4/2002 | Mohammed et al. |
| 6,385,596 B1 | 5/2002 | Wiser et al. |
| 6,385,727 B1 | 5/2002 | Cassagnol et al. |
| 6,389,535 B1 | 5/2002 | Thomlinson et al. |
| 6,389,537 B1 | 5/2002 | Davis et al. |
| 6,389,538 B1 | 5/2002 | Gruse et al. |
| 6,389,541 B1 | 5/2002 | Patterson |
| 6,393,427 B1 | 5/2002 | Vu et al. |
| 6,397,259 B1 | 5/2002 | Lincke et al. |
| 6,398,245 B1 | 6/2002 | Gruse et al. |
| 6,405,923 B1 | 6/2002 | Seysen |
| 6,408,170 B1 | 6/2002 | Schmidt et al. |
| 6,411,941 B1 | 6/2002 | Mullor et al. |
| 6,418,421 B1 | 7/2002 | Hurtado et al. |
| 6,424,714 B1 | 7/2002 | Wasilewski et al. |
| 6,424,715 B1 | 7/2002 | Saito |
| 6,438,690 B1 | 8/2002 | Patel et al. |
| 6,441,813 B1 | 8/2002 | Ishibashi |
| 6,442,529 B1 | 8/2002 | Krishan et al. |
| 6,442,690 B1 | 8/2002 | Howard, Jr. et al. |
| 6,446,207 B1 | 9/2002 | Vanstone et al. |
| 6,449,719 B1 | 9/2002 | Baker |
| 6,450,407 B1 | 9/2002 | Freeman et al. |
| 6,460,140 B1 | 10/2002 | Schoch et al. |
| 6,463,534 B1 | 10/2002 | Geiger et al. |
| 6,490,680 B1 | 12/2002 | Scheidt et al. |
| 6,496,858 B1 | 12/2002 | Frailong et al. |
| 6,502,079 B1 | 12/2002 | Ball et al. |
| 6,505,773 B1 | 1/2003 | Palmer et al. |
| 6,510,513 B1 | 1/2003 | Danieli |
| 6,532,451 B1 | 3/2003 | Schell et al. |
| 6,539,364 B2 | 3/2003 | Moribatake et al. |
| 6,549,626 B1 | 4/2003 | Al-Salqan |
| 6,550,011 B1 | 4/2003 | Sims, III |
| 6,557,105 B1 | 4/2003 | Tardo et al. |
| 6,567,793 B1 | 5/2003 | Hicks et al. |
| 6,571,216 B1 | 5/2003 | Garg et al. |
| 6,574,609 B1 | 6/2003 | Downs et al. |
| 6,574,611 B1 | 6/2003 | Matsuyama et al. |
| 6,574,612 B1 | 6/2003 | Baratti et al. |
| 6,581,331 B1 | 6/2003 | Kral |
| 6,585,158 B2 | 7/2003 | Norskog |
| 6,587,684 B1 | 7/2003 | Hsu et al. |
| 6,587,837 B1 | 7/2003 | Spagna et al. |
| 6,609,201 B1 | 8/2003 | Folmsbee |
| 6,615,350 B1 | 9/2003 | Schell et al. |
| 6,625,729 B1 | 9/2003 | Angelo |
| 6,631,478 B1 | 10/2003 | Wang et al. |
| 6,646,244 B2 | 11/2003 | Aas et al. |
| 6,664,948 B2 | 12/2003 | Crane et al. |
| 6,665,303 B1 | 12/2003 | Saito et al. |
| 6,671,737 B1 | 12/2003 | Snowdon et al. |
| 6,671,803 B1 | 12/2003 | Pasieka |
| 6,678,828 B1 | 1/2004 | Zhang et al. |
| 6,684,198 B1 | 1/2004 | Shimizu et al. |
| 6,690,556 B2 | 2/2004 | Smola et al. |
| 6,694,000 B2 | 2/2004 | Ung et al. |
| 6,698,020 B1 | 2/2004 | Zigmond et al. |
| 6,701,433 B1 | 3/2004 | Schell et al. |
| 6,704,873 B1 | 3/2004 | Underwood |
| 6,708,176 B2 | 3/2004 | Strunk et al. |
| 6,711,263 B1 | 3/2004 | Nordenstam et al. |
| 6,714,921 B2 | 3/2004 | Stefik et al. |
| 6,716,652 B1 | 4/2004 | Ortlieb |
| 6,738,810 B1 | 5/2004 | Kramer et al. |
| 6,763,458 B1 | 7/2004 | Watanabe |
| 6,765,470 B2 | 7/2004 | Shinzaki |
| 6,775,655 B1 | 8/2004 | Peinado et al. |
| 6,781,956 B1 | 8/2004 | Cheung |
| 6,791,157 B1 | 9/2004 | Casto et al. |
| 6,792,531 B2 | 9/2004 | Heiden et al. |
| 6,816,809 B2 | 11/2004 | Circenis |
| 6,816,900 B1 | 11/2004 | Vogel et al. |
| 6,820,063 B1 | 11/2004 | England et al. |
| 6,826,606 B2 | 11/2004 | Freeman et al. |
| 6,826,690 B1 | 11/2004 | Hind et al. |
| 6,834,352 B2 | 12/2004 | Shin |
| 6,837,427 B2 | 1/2005 | Overhultz et al. |
| 6,839,841 B1 | 1/2005 | Medvinsky et al. |
| 6,844,871 B1 | 1/2005 | Hinckley et al. |
| 6,847,942 B1 | 1/2005 | Land et al. |
| 6,850,252 B1 | 2/2005 | Hoffberg |
| 6,851,051 B1 | 2/2005 | Balle et al. |
| 6,856,800 B1 | 2/2005 | Henry et al. |
| 6,859,790 B1 | 2/2005 | Nonaka et al. |
| 6,868,433 B1 | 3/2005 | Philyaw |
| 6,871,283 B1 | 3/2005 | Zurko et al. |
| 6,895,504 B1 | 5/2005 | Zhang et al. |

(56) References Cited

U.S. PATENT DOCUMENTS

| | | |
|---|---|---|
| 6,898,286 B2 | 5/2005 | Murray |
| 6,920,567 B1 | 7/2005 | Doherty et al. |
| 6,922,724 B1 | 7/2005 | Frreman et al. |
| 6,934,692 B1 | 8/2005 | Duncan |
| 6,934,840 B2 | 8/2005 | Rich et al. |
| 6,934,942 B1 | 8/2005 | Chilimbi |
| 6,954,728 B1 | 10/2005 | Kusumoto et al. |
| 6,957,186 B1 | 10/2005 | Guheen et al. |
| 6,959,288 B1 | 10/2005 | Medina et al. |
| 6,959,290 B2 | 10/2005 | Stefik |
| 6,959,291 B1 | 10/2005 | Armstrong et al. |
| 6,959,384 B1 | 10/2005 | Serret-Avila |
| 6,961,858 B2 | 11/2005 | Fransdonk |
| 6,973,444 B1 | 12/2005 | Blinn et al. |
| 6,974,076 B1 | 12/2005 | Siegel |
| 6,976,162 B1 | 12/2005 | Ellison et al. |
| 6,976,163 B1 | 12/2005 | Hind et al. |
| 6,983,050 B1 | 1/2006 | Yacobi et al. |
| 6,985,958 B2 | 1/2006 | Lucovsky |
| 6,986,042 B2 | 1/2006 | Griffin |
| 6,990,174 B2 | 1/2006 | Eskelinen |
| 6,993,648 B2 | 1/2006 | Goodman et al. |
| 7,000,100 B2 | 2/2006 | Lacombe et al. |
| 7,000,829 B1 | 2/2006 | Harris et al. |
| 7,010,808 B1 | 3/2006 | Leung et al. |
| 7,013,286 B1 | 3/2006 | Aggarwal et al. |
| 7,013,384 B2 | 3/2006 | Challener et al. |
| 7,017,188 B1 | 3/2006 | Schmeidler et al. |
| 7,020,704 B1 | 3/2006 | Lipscomb et al. |
| 7,024,393 B1 | 4/2006 | Peinado |
| 7,028,149 B2 | 4/2006 | Grawrock |
| 7,028,180 B1 | 4/2006 | Aull et al. |
| 7,043,633 B1 | 5/2006 | Fink et al. |
| 7,051,005 B1 | 5/2006 | Peinado et al. |
| 7,052,530 B2 | 5/2006 | Edlund et al. |
| 7,054,468 B2 | 5/2006 | Yang |
| 7,055,031 B2 | 5/2006 | Platt |
| 7,055,169 B2 | 5/2006 | Delpuch et al. |
| 7,058,819 B2 | 6/2006 | Okane |
| 7,069,442 B2 | 6/2006 | Sutton, II |
| 7,069,595 B2 | 6/2006 | Cognigni et al. |
| 7,073,056 B2 | 7/2006 | Kocher |
| 7,073,063 B2 | 7/2006 | Peinado |
| 7,076,652 B2 | 7/2006 | Ginter et al. |
| 7,080,039 B1 | 7/2006 | Marsh |
| 7,089,594 B2 | 8/2006 | Lai et al. |
| 7,095,852 B2 | 8/2006 | Wack et al. |
| 7,096,469 B1 | 8/2006 | Kubala et al. |
| 7,097,357 B2 | 8/2006 | Johnson et al. |
| 7,100,199 B2 | 8/2006 | Ginter et al. |
| 7,103,574 B1 | 9/2006 | Peinado et al. |
| 7,113,912 B2 | 9/2006 | Stefik |
| 7,116,969 B2 | 10/2006 | Park |
| 7,117,183 B2 | 10/2006 | Blair et al. |
| 7,121,460 B1 | 10/2006 | Parsons et al. |
| 7,123,608 B1 | 10/2006 | Scott et al. |
| 7,124,115 B1 | 10/2006 | Herzberg et al. |
| 7,124,938 B1 | 10/2006 | Marsh |
| 7,127,579 B2 | 10/2006 | Zimmer |
| 7,130,951 B1 | 10/2006 | Christie et al. |
| 7,133,846 B1 | 11/2006 | Ginter et al. |
| 7,136,838 B1 | 11/2006 | Peinado et al. |
| 7,143,066 B2 | 11/2006 | Shear et al. |
| 7,143,297 B2 | 11/2006 | Buchheit et al. |
| 7,146,504 B2 | 12/2006 | Parks et al. |
| 7,162,645 B2 | 1/2007 | Iguchi et al. |
| 7,171,539 B2 | 1/2007 | Mansell et al. |
| 7,174,457 B1 | 2/2007 | England et al. |
| 7,194,092 B1 | 3/2007 | England et al. |
| 7,203,966 B2 | 4/2007 | Abburi et al. |
| 7,207,039 B2 | 4/2007 | Komarla et al. |
| 7,213,005 B2 | 5/2007 | Mourad et al. |
| 7,213,266 B1 | 5/2007 | Maher et al. |
| 7,216,363 B2 | 5/2007 | Serkowski et al. |
| 7,216,368 B2 | 5/2007 | Ishiguro |
| 7,219,071 B2 | 5/2007 | Gallagher |
| 7,222,062 B2 | 5/2007 | Goud et al. |
| 7,224,805 B2 | 5/2007 | Hurst et al. |
| 7,233,948 B1 | 6/2007 | Shamoon et al. |
| 7,234,144 B2 | 6/2007 | Wilt et al. |
| 7,234,638 B2 | 6/2007 | Lee et al. |
| 7,236,455 B1 | 6/2007 | Proudler et al. |
| 7,254,836 B2 | 8/2007 | Alkove et al. |
| 7,260,721 B2 | 8/2007 | Tanaka et al. |
| 7,266,569 B2 | 9/2007 | Cutter et al. |
| 7,266,714 B2 | 9/2007 | Davies et al. |
| 7,269,846 B2 | 9/2007 | Chennakeshu et al. |
| 7,284,124 B1 | 10/2007 | Ginsberg |
| 7,296,154 B2 | 11/2007 | Evans et al. |
| 7,296,296 B2 | 11/2007 | Dunbar et al. |
| 7,299,292 B2 | 11/2007 | Morten et al. |
| 7,299,358 B2 | 11/2007 | Chateau et al. |
| 7,302,709 B2 | 11/2007 | England et al. |
| 7,306,143 B2 | 12/2007 | Bonneau et al. |
| 7,310,732 B2 | 12/2007 | Matsuyama et al. |
| 7,315,941 B2 | 1/2008 | Ramzan et al. |
| 7,336,791 B2 | 2/2008 | Ishiguro |
| 7,343,496 B1 | 3/2008 | Hsiang et al. |
| 7,353,209 B1 | 4/2008 | Peinado et al. |
| 7,353,267 B1 | 4/2008 | Cunningham et al. |
| 7,353,402 B2 | 4/2008 | Bourne et al. |
| 7,356,682 B2 | 4/2008 | Lampson et al. |
| 7,356,709 B2 | 4/2008 | Gunyakti et al. |
| 7,359,807 B2 | 4/2008 | Frank et al. |
| 7,360,253 B2 | 4/2008 | Frank et al. |
| 7,376,834 B2 | 5/2008 | Edwards et al. |
| 7,376,976 B2 | 5/2008 | Fierstein et al. |
| 7,382,883 B2 | 6/2008 | Cross et al. |
| 7,383,205 B1 | 6/2008 | Peinado et al. |
| 7,392,429 B2 | 6/2008 | Frank et al. |
| 7,395,245 B2 | 7/2008 | Okamoto et al. |
| 7,395,452 B2 | 7/2008 | Nicholson et al. |
| 7,406,446 B2 | 7/2008 | Frank et al. |
| 7,421,413 B2 | 9/2008 | Frank et al. |
| 7,426,752 B2 | 9/2008 | Agrawal et al. |
| 7,441,121 B2 | 10/2008 | Cutter, Jr. et al. |
| 7,441,246 B2 | 10/2008 | Auerbach et al. |
| 7,444,509 B2 | 10/2008 | Nadalin et al. |
| 7,447,303 B1 | 11/2008 | Moneymaker |
| 7,451,202 B2 | 11/2008 | Nakahara et al. |
| 7,461,249 B1 | 12/2008 | Pearson et al. |
| 7,464,103 B2 | 12/2008 | Siu |
| 7,490,356 B2 | 2/2009 | Lieblich et al. |
| 7,493,487 B2 | 2/2009 | Phillips et al. |
| 7,494,277 B2 | 2/2009 | Setala |
| 7,500,267 B2 | 3/2009 | McKune et al. |
| 7,502,945 B2 | 3/2009 | Bourne et al. |
| 7,506,053 B1 | 3/2009 | Qin |
| 7,516,480 B2 | 4/2009 | Pearson et al. |
| 7,519,816 B2 | 4/2009 | Phillips |
| 7,526,649 B2 | 4/2009 | Wiseman |
| 7,539,863 B2 | 5/2009 | Phillips et al. |
| 7,540,024 B2 | 5/2009 | Phillips et al. |
| 7,549,060 B2 | 6/2009 | Bourne et al. |
| 7,552,331 B2 | 6/2009 | Evans et al. |
| 7,558,463 B2 | 7/2009 | Jain et al. |
| 7,562,220 B2 | 7/2009 | Frank et al. |
| 7,565,325 B2 | 7/2009 | Lenard |
| 7,568,096 B2 | 7/2009 | Evans et al. |
| 7,568,211 B2 | 7/2009 | Mai et al. |
| 7,571,488 B2 | 8/2009 | Oho et al. |
| 7,584,149 B1 | 9/2009 | Bishop et al. |
| 7,584,502 B2 | 9/2009 | Alkove et al. |
| 7,590,841 B2 | 9/2009 | Sherwani et al. |
| 7,596,784 B2 | 9/2009 | Abrams |
| 7,610,486 B2 | 10/2009 | Herrmann et al. |
| 7,610,631 B2 | 10/2009 | Frank et al. |
| 7,613,599 B2 | 11/2009 | Bade et al. |
| 7,617,401 B2 | 11/2009 | Marsh et al. |
| 7,634,661 B2 | 12/2009 | England et al. |
| 7,644,239 B2 | 1/2010 | Ergan et al. |
| 7,653,943 B2 | 1/2010 | Evans et al. |
| 7,665,143 B2 | 2/2010 | Havens et al. |
| 7,669,056 B2 | 2/2010 | Frank |

(56) References Cited

U.S. PATENT DOCUMENTS

| | | |
|---|---|---|
| 7,680,744 B2 | 3/2010 | Blinn et al. |
| 7,694,153 B2 | 4/2010 | Ahdout |
| 7,703,141 B2 | 4/2010 | Alkove et al. |
| 7,739,505 B2 | 6/2010 | Reneris et al. |
| 7,752,674 B2 | 7/2010 | Evans et al. |
| 7,769,174 B2 | 8/2010 | Cho et al. |
| 7,770,205 B2 | 8/2010 | Frank |
| 7,809,646 B2 | 10/2010 | Rose |
| 7,810,163 B2 | 10/2010 | Evans et al. |
| 7,814,532 B2 | 10/2010 | Cromer et al. |
| 7,877,607 B2 | 1/2011 | Circenis |
| 7,669,056 C1 | 2/2011 | Frank et al. |
| 7,891,007 B2 | 2/2011 | Waxman et al. |
| 7,900,140 B2 | 3/2011 | Mohammed et al. |
| 7,903,117 B2 | 3/2011 | Howell et al. |
| 7,958,029 B1 | 6/2011 | Bobich et al. |
| 7,979,721 B2 | 7/2011 | Westerinen et al. |
| 8,060,923 B2 | 11/2011 | Cutter et al. |
| 8,074,287 B2 | 12/2011 | Barde et al. |
| 8,176,564 B2 | 5/2012 | Frank et al. |
| 8,336,085 B2 | 12/2012 | Thirumalai et al. |
| 2001/0010076 A1 | 7/2001 | Wray |
| 2001/0021252 A1 | 9/2001 | Carter et al. |
| 2001/0034711 A1 | 10/2001 | Tashenberg |
| 2001/0044782 A1 | 11/2001 | Hughes |
| 2001/0049667 A1 | 12/2001 | Moribatake et al. |
| 2001/0051996 A1 | 12/2001 | Cooper et al. |
| 2001/0052077 A1 | 12/2001 | Fung et al. |
| 2001/0053223 A1 | 12/2001 | Ishibashi et al. |
| 2001/0056413 A1 | 12/2001 | Suzuki et al. |
| 2001/0056539 A1 | 12/2001 | Pavlin et al. |
| 2002/0002597 A1 | 1/2002 | Morrell, Jr. |
| 2002/0007310 A1 | 1/2002 | Long |
| 2002/0007314 A1 | 1/2002 | Maruyama |
| 2002/0013772 A1 | 1/2002 | Peinado |
| 2002/0016752 A1 | 2/2002 | Suh |
| 2002/0019814 A1 | 2/2002 | Ganesan |
| 2002/0023212 A1 | 2/2002 | Proudler |
| 2002/0026574 A1 | 2/2002 | Watanabe et al. |
| 2002/0044654 A1 | 4/2002 | Maeda et al. |
| 2002/0046098 A1 | 4/2002 | Maggio |
| 2002/0049679 A1 | 4/2002 | Russell et al. |
| 2002/0055906 A1 | 5/2002 | Katz et al. |
| 2002/0063933 A1 | 5/2002 | Maeda et al. |
| 2002/0065781 A1 | 5/2002 | Hillegass et al. |
| 2002/0073068 A1 | 6/2002 | Guha |
| 2002/0091569 A1 | 7/2002 | Kitaura et al. |
| 2002/0095603 A1 | 7/2002 | Godwin et al. |
| 2002/0107701 A1 | 8/2002 | Batty et al. |
| 2002/0107809 A1 | 8/2002 | Biddle et al. |
| 2002/0111916 A1 | 8/2002 | Caronna et al. |
| 2002/0112171 A1 | 8/2002 | Ginter et al. |
| 2002/0118835 A1 | 8/2002 | Uemura |
| 2002/0123964 A1 | 9/2002 | Kramer et al. |
| 2002/0124212 A1 | 9/2002 | Nitschke et al. |
| 2002/0129359 A1 | 9/2002 | Lichner |
| 2002/0138549 A1 | 9/2002 | Urien |
| 2002/0141451 A1 | 10/2002 | Gates et al. |
| 2002/0144131 A1 | 10/2002 | Spacey |
| 2002/0147601 A1 | 10/2002 | Fagan |
| 2002/0147782 A1 | 10/2002 | Dimitrova et al. |
| 2002/0147912 A1 | 10/2002 | Shmueli et al. |
| 2002/0169974 A1 | 11/2002 | McKune |
| 2002/0174125 A1* | 11/2002 | Lucovsky et al. ............ 707/100 |
| 2002/0178071 A1 | 11/2002 | Walker et al. |
| 2002/0184482 A1 | 12/2002 | Lacombe et al. |
| 2002/0184508 A1 | 12/2002 | Bialick et al. |
| 2002/0186843 A1 | 12/2002 | Weinstein et al. |
| 2002/0193101 A1 | 12/2002 | McAlinden |
| 2002/0194132 A1 | 12/2002 | Pearson et al. |
| 2002/0198845 A1 | 12/2002 | Lao et al. |
| 2002/0198846 A1 | 12/2002 | Lao |
| 2003/0005135 A1 | 1/2003 | Inoue et al. |
| 2003/0005335 A1 | 1/2003 | Watanabe |
| 2003/0014323 A1* | 1/2003 | Scheer ............................ 705/26 |
| 2003/0014496 A1 | 1/2003 | Spencer et al. |
| 2003/0014673 A1 | 1/2003 | Baum et al. |
| 2003/0018969 A1 | 1/2003 | Humpleman et al. |
| 2003/0021416 A1 | 1/2003 | Brown et al. |
| 2003/0023564 A1 | 1/2003 | Padhye et al. |
| 2003/0027549 A1 | 2/2003 | Kiel et al. |
| 2003/0028454 A1 | 2/2003 | Ooho et al. |
| 2003/0033543 A1 | 2/2003 | Hubbard et al. |
| 2003/0035409 A1 | 2/2003 | Wang et al. |
| 2003/0037246 A1 | 2/2003 | Goodman et al. |
| 2003/0040960 A1 | 2/2003 | Eckmann |
| 2003/0041008 A1 | 2/2003 | Grey et al. |
| 2003/0046026 A1 | 3/2003 | Levy et al. |
| 2003/0046238 A1 | 3/2003 | Nonaka et al. |
| 2003/0048473 A1 | 3/2003 | Rosen |
| 2003/0050831 A1 | 3/2003 | Klayh |
| 2003/0056107 A1 | 3/2003 | Cammack et al. |
| 2003/0065918 A1 | 4/2003 | Willey |
| 2003/0069854 A1 | 4/2003 | Hsu et al. |
| 2003/0069981 A1 | 4/2003 | Trovato |
| 2003/0078853 A1 | 4/2003 | Peinado et al. |
| 2003/0084104 A1 | 5/2003 | Salem et al. |
| 2003/0084278 A1 | 5/2003 | Cromer et al. |
| 2003/0084285 A1 | 5/2003 | Cromer et al. |
| 2003/0084337 A1 | 5/2003 | Simionescu et al. |
| 2003/0084352 A1 | 5/2003 | Schwartz et al. |
| 2003/0088500 A1 | 5/2003 | Shinohara et al. |
| 2003/0093694 A1 | 5/2003 | Medvinsky et al. |
| 2003/0097596 A1 | 5/2003 | Muratov et al. |
| 2003/0110388 A1 | 6/2003 | Pavlin et al. |
| 2003/0115458 A1 | 6/2003 | Song |
| 2003/0120935 A1 | 6/2003 | Teal et al. |
| 2003/0126519 A1 | 7/2003 | Odorcic |
| 2003/0131252 A1 | 7/2003 | Barton et al. |
| 2003/0133576 A1 | 7/2003 | Grumiaux |
| 2003/0135380 A1 | 7/2003 | Lehr et al. |
| 2003/0149670 A1 | 8/2003 | Cronce |
| 2003/0149671 A1 | 8/2003 | Yamamoto et al. |
| 2003/0149875 A1 | 8/2003 | Hosaka |
| 2003/0156572 A1 | 8/2003 | Hui et al. |
| 2003/0156719 A1 | 8/2003 | Cronce |
| 2003/0163383 A1 | 8/2003 | Engelhart |
| 2003/0163712 A1 | 8/2003 | LaMothe et al. |
| 2003/0172376 A1 | 9/2003 | Coffin, III et al. |
| 2003/0185395 A1 | 10/2003 | Lee et al. |
| 2003/0188165 A1 | 10/2003 | Sutton et al. |
| 2003/0188179 A1 | 10/2003 | Challener et al. |
| 2003/0194094 A1 | 10/2003 | Lampson et al. |
| 2003/0196102 A1 | 10/2003 | Mccarroll |
| 2003/0196106 A1 | 10/2003 | Erfani et al. |
| 2003/0198350 A1 | 10/2003 | Foster et al. |
| 2003/0200336 A1 | 10/2003 | Pal et al. |
| 2003/0208338 A1 | 11/2003 | Challener et al. |
| 2003/0208573 A1 | 11/2003 | Harrison et al. |
| 2003/0208673 A1 | 11/2003 | Chaudhry et al. |
| 2003/0229702 A1 | 12/2003 | Hensbergen et al. |
| 2003/0233553 A1 | 12/2003 | Parks et al. |
| 2003/0236756 A1 | 12/2003 | Humpleman et al. |
| 2004/0001088 A1 | 1/2004 | Stancil et al. |
| 2004/0001594 A1 | 1/2004 | Krishnaswamy et al. |
| 2004/0003190 A1 | 1/2004 | Childs et al. |
| 2004/0003268 A1 | 1/2004 | Bourne et al. |
| 2004/0003269 A1 | 1/2004 | Waxman et al. |
| 2004/0003270 A1 | 1/2004 | Bourne et al. |
| 2004/0003288 A1 | 1/2004 | Wiseman et al. |
| 2004/0010440 A1 | 1/2004 | Lenard et al. |
| 2004/0019456 A1 | 1/2004 | Cirenis |
| 2004/0023636 A1 | 2/2004 | Gurel et al. |
| 2004/0030912 A1 | 2/2004 | Merkle, Jr. et al. |
| 2004/0034816 A1 | 2/2004 | Richard |
| 2004/0039916 A1 | 2/2004 | Aldis et al. |
| 2004/0039924 A1 | 2/2004 | Baldwin et al. |
| 2004/0039960 A1 | 2/2004 | Kassayan |
| 2004/0044629 A1 | 3/2004 | Rhodes et al. |
| 2004/0054678 A1 | 3/2004 | Okamoto et al. |
| 2004/0054907 A1 | 3/2004 | Chateau et al. |
| 2004/0054908 A1 | 3/2004 | Circenis et al. |
| 2004/0054909 A1 | 3/2004 | Serkowski et al. |
| 2004/0059937 A1 | 3/2004 | Nakano |

(56) References Cited

U.S. PATENT DOCUMENTS

| | | |
|---|---|---|
| 2004/0064351 A1 | 4/2004 | Mikurak |
| 2004/0064707 A1 | 4/2004 | Mccann et al. |
| 2004/0067746 A1 | 4/2004 | Johnson |
| 2004/0073670 A1 | 4/2004 | Chack et al. |
| 2004/0088548 A1 | 5/2004 | Smetters et al. |
| 2004/0093371 A1 | 5/2004 | Burrows et al. |
| 2004/0093508 A1 | 5/2004 | Foerstner et al. |
| 2004/0107125 A1 | 6/2004 | Guheen et al. |
| 2004/0107356 A1 | 6/2004 | Shamoon et al. |
| 2004/0107359 A1 | 6/2004 | Kawano et al. |
| 2004/0107368 A1 | 6/2004 | Colvin |
| 2004/0111615 A1 | 6/2004 | Nyang et al. |
| 2004/0123127 A1 | 6/2004 | Teicher et al. |
| 2004/0125755 A1 | 7/2004 | Roberts |
| 2004/0128251 A1 | 7/2004 | Adam et al. |
| 2004/0133794 A1 | 7/2004 | Kocher et al. |
| 2004/0139027 A1 | 7/2004 | Malara |
| 2004/0139312 A1 | 7/2004 | Medvinsky |
| 2004/0146015 A1 | 7/2004 | Cross et al. |
| 2004/0158742 A1 | 8/2004 | Srinivasan et al. |
| 2004/0184605 A1 | 9/2004 | Soliman |
| 2004/0193919 A1 | 9/2004 | Dabbish et al. |
| 2004/0199769 A1 | 10/2004 | Proudler |
| 2004/0205028 A1 | 10/2004 | Verosub et al. |
| 2004/0205357 A1 | 10/2004 | Kuo et al. |
| 2004/0205510 A1 | 10/2004 | Rising |
| 2004/0220858 A1 | 11/2004 | Maggio |
| 2004/0225894 A1 | 11/2004 | Colvin |
| 2004/0255000 A1 | 12/2004 | Simionescu et al. |
| 2004/0268120 A1 | 12/2004 | Mirtal et al. |
| 2005/0015343 A1 | 1/2005 | Nagai et al. |
| 2005/0021944 A1 | 1/2005 | Craft et al. |
| 2005/0021992 A1 | 1/2005 | Aida et al. |
| 2005/0028000 A1 | 2/2005 | Bulusu et al. |
| 2005/0033747 A1 | 2/2005 | Wittkotter |
| 2005/0039013 A1 | 2/2005 | Bajikar et al. |
| 2005/0044197 A1 | 2/2005 | Lai |
| 2005/0044397 A1 | 2/2005 | Bjorkengren |
| 2005/0050355 A1 | 3/2005 | Graunke |
| 2005/0060388 A1 | 3/2005 | Tatsumi et al. |
| 2005/0065880 A1 | 3/2005 | Amato et al. |
| 2005/0080701 A1 | 4/2005 | Tunney et al. |
| 2005/0080801 A1 | 4/2005 | Kothandaraman et al. |
| 2005/0086174 A1 | 4/2005 | Eng |
| 2005/0091104 A1 | 4/2005 | Abraham |
| 2005/0097204 A1 | 5/2005 | Horowitz et al. |
| 2005/0102181 A1 | 5/2005 | Scroggie et al. |
| 2005/0108547 A1 | 5/2005 | Sakai |
| 2005/0108564 A1 | 5/2005 | Freeman et al. |
| 2005/0120125 A1 | 6/2005 | Morten et al. |
| 2005/0120251 A1 | 6/2005 | Fukumori |
| 2005/0125673 A1 | 6/2005 | Cheng et al. |
| 2005/0129296 A1 | 6/2005 | Setala |
| 2005/0132150 A1 | 6/2005 | Jewell et al. |
| 2005/0138338 A1 | 6/2005 | Sodani et al. |
| 2005/0138370 A1 | 6/2005 | Goud et al. |
| 2005/0138389 A1 | 6/2005 | Catherman et al. |
| 2005/0138406 A1 | 6/2005 | Cox |
| 2005/0138423 A1 | 6/2005 | Ranganathan |
| 2005/0141717 A1 | 6/2005 | Cromer et al. |
| 2005/0144073 A1 | 6/2005 | Morrisroe et al. |
| 2005/0144099 A1 | 6/2005 | Deb et al. |
| 2005/0149722 A1 | 7/2005 | Wiseman |
| 2005/0149723 A1 | 7/2005 | Watkins et al. |
| 2005/0149729 A1 | 7/2005 | Zimmer et al. |
| 2005/0166051 A1 | 7/2005 | Buer |
| 2005/0172121 A1 | 8/2005 | Risan et al. |
| 2005/0182921 A1 | 8/2005 | Duncan |
| 2005/0182940 A1 | 8/2005 | Sutton |
| 2005/0188843 A1 | 9/2005 | Edlund et al. |
| 2005/0198510 A1 | 9/2005 | Robert et al. |
| 2005/0203801 A1 | 9/2005 | Morgenstern et al. |
| 2005/0210252 A1 | 9/2005 | Freeman et al. |
| 2005/0213761 A1 | 9/2005 | Walmsley et al. |
| 2005/0216346 A1 | 9/2005 | Kusumoto et al. |
| 2005/0216577 A1 | 9/2005 | Durham et al. |
| 2005/0221766 A1 | 10/2005 | Brizek et al. |
| 2005/0226170 A1 | 10/2005 | Relan et al. |
| 2005/0235141 A1 | 10/2005 | Ibrahim et al. |
| 2005/0240533 A1 | 10/2005 | Cutter et al. |
| 2005/0246521 A1 | 11/2005 | Bade et al. |
| 2005/0246525 A1 | 11/2005 | Bade et al. |
| 2005/0246552 A1 | 11/2005 | Bade et al. |
| 2005/0257073 A1 | 11/2005 | Bade |
| 2005/0268115 A1 | 12/2005 | Barde et al. |
| 2005/0268174 A1 | 12/2005 | Kumagai |
| 2005/0275866 A1 | 12/2005 | Corlett |
| 2005/0278519 A1 | 12/2005 | Luebke et al. |
| 2005/0279827 A1 | 12/2005 | Mascavage et al. |
| 2005/0283601 A1 | 12/2005 | Tahan |
| 2005/0286476 A1 | 12/2005 | Crosswy et al. |
| 2005/0289177 A1 | 12/2005 | Hohmann, II |
| 2005/0289343 A1 | 12/2005 | Tahan |
| 2006/0010076 A1 | 1/2006 | Cutter et al. |
| 2006/0010326 A1 | 1/2006 | Bade et al. |
| 2006/0015717 A1 | 1/2006 | Liu et al. |
| 2006/0015718 A1 | 1/2006 | Liu et al. |
| 2006/0015732 A1 | 1/2006 | Liu |
| 2006/0020784 A1 | 1/2006 | Jonker et al. |
| 2006/0020821 A1 | 1/2006 | Waltermann et al. |
| 2006/0020860 A1 | 1/2006 | Tardif et al. |
| 2006/0026418 A1 | 2/2006 | Bade |
| 2006/0026419 A1 | 2/2006 | Arndt et al. |
| 2006/0026422 A1 | 2/2006 | Bade et al. |
| 2006/0026569 A1 | 2/2006 | Oerting et al. |
| 2006/0041754 A1 | 2/2006 | Hind et al. |
| 2006/0045267 A1 | 3/2006 | Moore et al. |
| 2006/0053112 A1 | 3/2006 | Chitkara et al. |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry et al. |
| 2006/0075014 A1 | 4/2006 | Tharappel et al. |
| 2006/0075223 A1 | 4/2006 | Bade et al. |
| 2006/0085634 A1 | 4/2006 | Jain et al. |
| 2006/0085637 A1 | 4/2006 | Pinkas |
| 2006/0085844 A1 | 4/2006 | Buer et al. |
| 2006/0089917 A1 | 4/2006 | Strom et al. |
| 2006/0090084 A1 | 4/2006 | Buer |
| 2006/0100010 A1 | 5/2006 | Gatto et al. |
| 2006/0101155 A1 | 5/2006 | Damour et al. |
| 2006/0106845 A1 | 5/2006 | Frank et al. |
| 2006/0106920 A1 | 5/2006 | Steeb et al. |
| 2006/0107306 A1 | 5/2006 | Thirumalai et al. |
| 2006/0107328 A1 | 5/2006 | Frank et al. |
| 2006/0107335 A1 | 5/2006 | Frank et al. |
| 2006/0112267 A1 | 5/2006 | Zimmer et al. |
| 2006/0117177 A1 | 6/2006 | Buer |
| 2006/0129496 A1 | 6/2006 | Chow et al. |
| 2006/0129824 A1 | 6/2006 | Hoff et al. |
| 2006/0130130 A1 | 6/2006 | Kablotsky |
| 2006/0136717 A1 | 6/2006 | Buer et al. |
| 2006/0143431 A1 | 6/2006 | Rothman et al. |
| 2006/0149966 A1 | 7/2006 | Buskey et al. |
| 2006/0156008 A1 | 7/2006 | Frank |
| 2006/0156416 A1 | 7/2006 | Huotari et al. |
| 2006/0165005 A1 | 7/2006 | Frank et al. |
| 2006/0165227 A1 | 7/2006 | Steeb et al. |
| 2006/0167814 A1 | 7/2006 | Peinado |
| 2006/0167815 A1 | 7/2006 | Peinado et al. |
| 2006/0168664 A1 | 7/2006 | Frank et al. |
| 2006/0173787 A1 | 8/2006 | Weber et al. |
| 2006/0174110 A1 | 8/2006 | Strom et al. |
| 2006/0206618 A1 | 9/2006 | Zimmer et al. |
| 2006/0212350 A1 | 9/2006 | Ellis et al. |
| 2006/0212363 A1 | 9/2006 | Peinado |
| 2006/0212945 A1 | 9/2006 | Donlin |
| 2006/0213997 A1 | 9/2006 | Frank et al. |
| 2006/0227364 A1 | 10/2006 | Frank et al. |
| 2006/0229990 A1 | 10/2006 | Shimoji et al. |
| 2006/0235798 A1 | 10/2006 | Alkove et al. |
| 2006/0235799 A1 | 10/2006 | Evans et al. |
| 2006/0235801 A1 | 10/2006 | Storm et al. |
| 2006/0242406 A1 | 10/2006 | Barde et al. |

(56) References Cited

U.S. PATENT DOCUMENTS

| | | |
|---|---|---|
| 2006/0248594 A1 | 11/2006 | Grigorovitch et al. |
| 2006/0248596 A1 | 11/2006 | Jain et al. |
| 2006/0265493 A1 | 11/2006 | Brindley et al. |
| 2006/0265508 A1 | 11/2006 | Angel et al. |
| 2006/0265758 A1 | 11/2006 | Khandelwal et al. |
| 2006/0282319 A1 | 12/2006 | Maggio |
| 2006/0282899 A1 | 12/2006 | Raciborski |
| 2007/0033102 A1 | 2/2007 | Frank et al. |
| 2007/0058807 A1 | 3/2007 | Marsh |
| 2007/0106521 A1 | 5/2007 | Ho et al. |
| 2007/0214043 A1 | 9/2007 | Yasuda |
| 2007/0280422 A1 | 12/2007 | Setala |
| 2008/0021909 A1 | 1/2008 | Black et al. |
| 2008/0254883 A1 | 10/2008 | Patel et al. |
| 2008/0307495 A1 | 12/2008 | Holtzman et al. |
| 2009/0132815 A1 | 5/2009 | Ginter et al. |
| 2009/0158036 A1 | 6/2009 | Barde et al. |
| 2010/0177891 A1 | 7/2010 | Keidar et al. |
| 2011/0128290 A1 | 6/2011 | Howell et al. |
| 2012/0137127 A1 | 5/2012 | Jain et al. |

FOREIGN PATENT DOCUMENTS

| | | |
|---|---|---|
| EP | 0613073 | 8/1994 |
| EP | 0635790 | 1/1995 |
| EP | 0665486 | 8/1995 |
| EP | 0709760 | 5/1996 |
| EP | 0715245 | 6/1996 |
| EP | 0715246 | 6/1996 |
| EP | 0715247 | 6/1996 |
| EP | 0725512 | 8/1996 |
| EP | 0752663 | 1/1997 |
| EP | 0778512 | 6/1997 |
| EP | 0789361 | 8/1997 |
| EP | 0798892 | 10/1997 |
| EP | 0843449 | 5/1998 |
| EP | 0849658 | 6/1998 |
| EP | 0874300 | 10/1998 |
| EP | 0887723 | 12/1998 |
| EP | 1061465 | 12/2000 |
| EP | 1085396 | 3/2001 |
| EP | 1120967 | 8/2001 |
| EP | 1330759 A2 | 5/2002 |
| EP | 1287636 | 3/2003 |
| EP | 1292065 | 3/2003 |
| EP | 1363424 | 11/2003 |
| EP | 1378811 | 1/2004 |
| EP | 1387237 | 2/2004 |
| EP | 1429224 | 6/2004 |
| EP | 1223722 | 8/2004 |
| EP | 1442388 A2 | 8/2004 |
| EP | 1460514 | 9/2004 |
| EP | 1233337 | 8/2005 |
| EP | 0671711 A1 | 9/2005 |
| GB | 2359969 | 9/2001 |
| GB | 2378780 | 2/2003 |
| GB | 0411654.7 | 6/2004 |
| JP | 2291043 | 11/1990 |
| JP | H0535461 | 2/1993 |
| JP | H0635718 | 2/1994 |
| JP | H0736559 | 2/1995 |
| JP | H07141153 | 6/1995 |
| JP | H086729 | 1/1996 |
| JP | 9006880 | 1/1997 |
| JP | 2001526550 | 5/1997 |
| JP | H09185504 | 7/1997 |
| JP | H9251494 | 9/1997 |
| JP | 9069044 | 11/1997 |
| JP | H1091556 | 4/1998 |
| JP | 2000293369 | 10/2000 |
| JP | 2001051742 | 2/2001 |
| JP | 2003510684 | 3/2001 |
| JP | 2001101033 | 4/2001 |
| JP | 2003510713 | 4/2001 |
| JP | 2001175605 | 6/2001 |
| JP | 2001184472 | 7/2001 |
| JP | 2001312325 | 11/2001 |
| JP | 2001331229 | 11/2001 |
| JP | 2001338233 | 12/2001 |
| JP | 2002108478 | 4/2002 |
| JP | 2002108870 | 4/2002 |
| JP | 2002-251478 | 9/2002 |
| JP | 2002374327 | 12/2002 |
| JP | 2003507785 | 2/2003 |
| JP | 2003140761 | 5/2003 |
| JP | 2003140762 | 5/2003 |
| JP | 2003157335 | 5/2003 |
| JP | 2003208314 | 7/2003 |
| JP | 2003-242415 | 8/2003 |
| JP | 2003248522 | 9/2003 |
| JP | 2003296487 | 10/2003 |
| JP | 2002182562 | 1/2004 |
| JP | 2004-54932 | 2/2004 |
| JP | 2004062561 | 2/2004 |
| JP | 2004118327 | 4/2004 |
| JP | 2004164491 | 6/2004 |
| JP | 2004295846 | 10/2004 |
| JP | 2004304755 | 10/2004 |
| JP | 2005-190481 | 7/2005 |
| JP | 2007525774 | 9/2007 |
| JP | H08-054952 | 2/2011 |
| KP | 10-2001-0103359 A | 11/2001 |
| KR | 10-1999-025230 A | 4/1999 |
| KR | 2001-0000805 | 1/2001 |
| KR | 20010000805 | 1/2001 |
| KR | 2002-37453 | 5/2002 |
| KR | 20020037453 | 5/2002 |
| KR | 2005-8439 | 1/2005 |
| KR | 20050008439 | 1/2005 |
| KR | 2005-21782 | 3/2005 |
| KR | 20050021782 | 3/2005 |
| KR | 20060028463 A | 3/2006 |
| KR | 20060103035 A | 9/2006 |
| WO | WO9301550 | 1/1993 |
| WO | WO9613013 | 5/1996 |
| WO | WO9624092 | 8/1996 |
| WO | WO9627155 | 9/1996 |
| WO | WO-9721162 | 6/1997 |
| WO | WO9725798 | 7/1997 |
| WO | WO9743761 | 11/1997 |
| WO | WO9809209 | 3/1998 |
| WO | WO9810381 | 3/1998 |
| WO | WO-9811478 | 3/1998 |
| WO | WO9821679 | 5/1998 |
| WO | WO9824037 | 6/1998 |
| WO | WO9837481 | 8/1998 |
| WO | WO9842098 | 9/1998 |
| WO | WO9858306 | 12/1998 |
| WO | WO9915970 | 4/1999 |
| WO | WO9953689 | 10/1999 |
| WO | WO0008909 | 2/2000 |
| WO | WO 00/48062 | 8/2000 |
| WO | WO-0054126 | 9/2000 |
| WO | WO0057684 | 10/2000 |
| WO | WO0058810 | 10/2000 |
| WO | WO0058811 | 10/2000 |
| WO | WO0058859 | 10/2000 |
| WO | WO0059150 | 10/2000 |
| WO | WO0059152 | 10/2000 |
| WO | WO-01/35293 | 5/2001 |
| WO | WO0135293 | 5/2001 |
| WO | WO-01/45012 | 6/2001 |
| WO | WO0144908 A1 | 6/2001 |
| WO | WO0145012 | 6/2001 |
| WO | WO0152020 A1 | 7/2001 |
| WO | WO0152021 A1 | 7/2001 |
| WO | WO-0163512 | 8/2001 |
| WO | WO-0177795 | 10/2001 |
| WO | WO-0193461 | 12/2001 |
| WO | WO-0208969 | 1/2002 |
| WO | WO0219598 A2 | 3/2002 |
| WO | WO0237371 A1 | 5/2002 |
| WO | WO-02056155 | 7/2002 |

(56) References Cited

FOREIGN PATENT DOCUMENTS

| WO | WO-02103495 | 12/2002 |
|---|---|---|
| WO | WO-03009115 | 1/2003 |
| WO | WO-03030434 | 4/2003 |
| WO | WO-03073688 | 9/2003 |
| WO | WO-03107585 | 12/2003 |
| WO | WO-03107588 | 12/2003 |
| WO | 2004053618 A2 | 6/2004 |
| WO | WO-2004092886 | 10/2004 |
| WO | WO2005091757 A2 | 10/2005 |
| WO | WO2006065012 A1 | 6/2006 |
| WO | WO-2007032974 | 3/2007 |

OTHER PUBLICATIONS

"International Search Report and Written Opinion mailed Apr. 25, 2007", Application No. PCT/US05/040965, 5 pages.
"International Search Report and Written Opinion mailed Sep. 25, 2006", Application No. PCT/US05/40949, 7 pages.
"EP Office Action Mailed Nov. 17, 2006", Application No. 05110697.9, 6 pages.
"EP Office Action mailed Apr. 5, 2007", Application No. 05110697.9, 5 pages.
"EP Summons to Attend Oral Proceedings mailed Sep. 27, 2007", Application No. 05110697.9, 7 pages.
"Decision to Refuse a European Application mailed Feb. 15, 2008", Application No. 05110697.9, 45 pages.
"International Search Report and Written Opinion mailed Sep. 8, 2006", Application No. PCT/US05/40942, 20 pages.
"European Search Report mailed Dec. 6, 2010", Application No. EP/05820177, 8 pages.
Lampson, Butler et al., "Authentication in Distributed Systems: Theory and Practice", *ACM Transactions on Computer Systems*, v10, 265,(1992), 18 pages.
"DMOD WorkSpace OEM Unique Features", www.dmod.com/oem_features, Retrieved from the Internet on Jan. 12, 2005, 3 pages.
"Notice of Rejection mailed Jun. 7, 2011", Japanese Application No. 2007-541361, 3 pages.
"Office Action mailed Jun. 29, 2009", Mexican Application No. MX/a/2007/005657, 2 pages.
"Search Report Dated Jan. 11, 2008", EP Application No. 05820090.8, 7 pages.
"Examination Report mailed Mar. 5, 2008", EP Application No. 05820090.8, 1 pages.
"First Office Action mailed Apr. 11, 2008", Chinese Application No. 200580038813.9, 11 pages.
"Office Action mailed Jun. 29, 2009", Mexican Application No. MX/a/2007/005656, 6 pages.
"Office Action mailed Nov. 30, 2009", Mexican Application No. MX/a/2007/005659, 6 pages.
"Notice of Allowance mailed Jul. 2, 2010", Mexican Application No. MX/a/2007/005659, 2 pages.
"Second Office Action mailed Dec. 18, 2009", Chinese Application No. 200580038812.4, 24 pages.
"Third Office Action mailed Apr. 1, 2010", Chinese Application No. 200580038812.4, 9 pages.
"Notice on Grant of Patent Right for Invention mailed May 5, 2011", Chinese Application No. 200580038812.4, 4 pages.
"Office Action mailed Jul. 7, 2009", Mexican Application No. MX/a/2007/005660, 8 pages.
"Notice of Allowance mailed Feb. 18, 2010", Mexican Application No. MX/a/2007/005660, 2 pages.
"Extended European Search Report mailed Aug. 13, 2010", EP Application No. 05823253.9, 7 pages.
"Notice on the First Office Action mailed Sep. 27, 2010", Chinese Application No. 200580038745.6, 6 pages.
"Office Action mailed Jul. 8, 2009", Mexican Application No. MX/a/2007/005662, 7 pages.
"Notice of Allowance mailed Feb. 19, 2010", Mexican Application No. MX/a/2007/005662, 2 pages.

"Partial Search Report mailed Jul 23, 2010", EP Application No. 05821183.0.
"Extended European Search Report mailed Jan. 7, 2011", EP Application No. 05821183.0, 9 pages.
"Notice of Allowance mailed Dec. 25, 2009", Chinese Application No. 200580038773.8, 4 pages.
"Office Action mailed Jun. 26, 2009", Mexican Application No. MX/a/2007/005655, 5 pages.
"Office Action mailed Feb. 9, 2010", Mexican Application No. MX/a/2007/005655, 6 pages.
"Office Action mailed Sep. 24, 2010", Mexican Application No. MX/a/2007/005655, 3 pages.
"Extended European Search Report mailed Jan. 21, 2010", EP Application No. 05819896.1, 8 pages.
"Office Action mailed Mar. 19, 2010", EP Application No. 05819896.1, 1 page.
"Office Action mailed Feb. 10, 2010", Mexican Application No. MX/a/2007/005656, 5 pages.
"Office Action mailed Oct. 18, 2010", Mexican Application No. MX/a/2007/005656, 3 pages.
"Office Action mailed May 22, 2009", Chinese Application No. 200580038771.9, 5 pages.
"Notice on the First Office Action mailed Jul. 30, 2010", Chinese Application No. 200680033207.2, 7 pages.
"EP Search Report mailed Jan. 2, 2008", EP Application No. 05109616.2, 7 pages.
"Flonix: USB Desktop OS Solutions Provider, http://www.flonix.com", Retrieved from the Internet Jun. 1, 2005, (Copyright 2004), 2 pages.
"Migo by PowerHouse Technologies Group, http://www.4migo.com", Retrieved from the Internet Jun. 1, 2005, (Copyright 2003), 3 pages.
"WebServUSB, http://www.webservusb.com", Retrieved from the Internet Jun. 1, 2005, (Copyright 2004), 16 pages.
"Notice of Rejection mailed Sep. 9, 2011", JP Application No. 2007-548385, 9 pages.
"EP Office Action mailed Mar. 8, 2012", EP Application No. 05109616.2, 6 pages.
"Office Action mailed Jun. 8, 2012", Japanese Application No. 2005-301957, 8 pages.
Nakajima, S.; "Do You Really Know It? Basics of Windows2000/XP, Network, 4th Installment, What is Logon Like?," Nikkei Windows for IT professionals, Jan. 2004 (No. 82), pp. 116-121, Nikkei Business Publications, Inc., Jan. 1, 2004, ISSN: 1346-8308.
"First Special Feature, Security-oriented Web Application Development, Part 3, Method for Realizing Secure Session Management," N+I Network Guide, Jan. 2004 (vol. 4, No. 1, Serial No. 32), pp. 47-59, Softbank Publishing Inc., Jan. 1, 2004.
"Notice on Grant of Patent mailed Oct. 20, 2010", CN Application No. 200680006199.2, 4 pages.
"First Office Action mailed Aug. 21, 2009", CN Application No. 200680030846.3, 8 pages.
"Notice of Rejection mailed Jul. 12, 2011", JP Application No. 2007-541351, 4 pages.
"Notice of Rejection mailed Jul. 22, 2011", JP Application No. 2007-541362.
"Notice of Rejection mailed Jul. 15, 2011", JP Application No. 2007-541356, 4 pages.
"Notice of Rejection mailed Jul. 26, 2011", JP Application No. 2007-541352, 5 pages.
"Notice of Rejection mailed Jul. 22, 2011", JP Application No. 2007-541355, 4 pages.
"Notice on the First Office Action mailed Dec. 11, 2009", CN Application No. 200510127170.7, 16 pages.
"Notice of Rejection mailed Jun. 21, 2011", JP Application No. 2005-330496, 6 pages.
"The Third Office Action mailed Jun. 5, 2009", CN Application No. 200680006199.2, 7 pages.
"Notice of Rejection mailed Nov. 11, 2011", Japanese Application No. 2005-301957, 21 pages.

(56) References Cited

OTHER PUBLICATIONS

Utagawa, Mari et al., "Creation of Card Application by IC Card OS 'MULTOS' Which Can Rewrite Application", Interface, vol. 29, No. 3, ISSN: 0387-9569, CQ Publishing Co. Ltd., (Mar. 1, 2003), pp. 46-55.
"Extended European Search Report mailed Dec. 21, 2011", EP Application No. 05854752.2, 7 pages.
Office Action mailed Dec. 7, 2011', JP Application No. 2008-528054, 7 pages.
"Final Rejection mailed Jan. 17, 2012", Japan Application No. 2007-552142, 8 pages.
Written Opinion for PCT/US2006/034622 mailed Jan. 16, 2007.
International Search Report for PCT/US2006/034622 mailed Jan. 16, 2007.
"International Search Report and Written Opinion mailed Apr. 22, 2008", Application No. PCT/US2007/087960, 7 pages.
Eren, H. et al., "Fringe-Effect Capacitive Proximity Sensors for Tamper Proof Enclosures", *Proceedings of 2005 Sensors for Industry Conference*, (Feb., 2005), pp. 22-25.
"International Search Report and Written Opinion mailed Nov. 15, 2004", Application No. PCT/US05/40966, 9 pages.
Schneier, B. "Applied Cryptography, Second Edition: Protocols, Algorithms, and Source Code in C (cloth)", (Jan. 1, 1996), 13 pages.
Goering, Richard "Web Venture Offers Metered Access to EDA Packages—Startup Winds Clocks by the Hour Tools (E*CAD Will Launch Web Site That Provides Pay-Per-Use and Pay-Per-Hour Access to Range of Chip Design Software)", *Electronic Engineering Times*, (Nov. 6, 2000), 3 pages.
Zemao, Chen et al., "A Malicious Code Immune Model Based on Program Encryption", *IEEE—Wireless Communication, Networking and Mobile Computing*, WICOM '08, 4th International Conference on Oct. 12-14, 2008, 5 pages.
Mufti, Dr. Muid et al., "Design and Implementation of a Secure Mobile IP Protocol", *Networking and Communication, INCC 204*, International Conference on Jun. 11-13, 2004, 5 pages.
Davida, George I., et al., "Unix Guardians: Active User Intervention in Data Protection" *Aerospace Computer Security Applications Conference*, Fourth Dec. 12-16, 1988, 6 pages.
Gao, Jerry et al., "Online Advertising—Taxonomy and Engineering Perspectives", http://www.engr.sjsu.edu/gaojerry/report/On_lineAdvertising%20.pdf, (2002), 33 pages.
Oshiba, Takashi et al., "Personalized Advertisement-Duration Control for Streaming Delivery", *ACM Multimedia*, (2002), 8 pages.
Yue, Wei T., et al., "The Reward Based Online Shopping Community", *Routledge* vol. 10, No. 4, (Oct. 1, 2000), 2 pages.
"International Search Report and Written Opinion mailed Nov. 8, 2007", Application No. PCT/US05/40967, 6 pages.
"Notice of Rejection mailed Jul. 5, 2011", Japanese Application No. 2007-541363, 10 pages.
"Notice of Rejection mailed Aug. 5, 2011", Japanese Patent Application No. 2007-552142, 8 pages.
"Office Action mailed Jul. 4, 2012", Korean Application No. 10-2007-7012294, 2 pages.
Extended European Search Report; EP Application No. 05851550.3 of Jul. 5, 2012; 6 pages.
"International Search Report mailed Jan. 5, 2007", Application No. PCT/US2006/032708, 3 pages.
PR Newswire, "Forward Solutions Unveils Industry's Most Advanced Portable Personal Computing System on USB Flash Memory Device", Sep. 22, 2003, Proquest, p. 1-3.
"Extended European Search Report mailed Dec. 6, 2010", EP Application No. 05820177.3, 8 pages.
"Forward Solutions Unveils Industry's Most Advanced Portable Personal Computing System on USB Flash Memory Device", Proquest, PR Newswire, http://proquest.umi.com/pqdweb?index=20&did=408811931&SrchMode=1&sid=6&Fmt=3,Retreived from the Internet Feb. 15, 2008, (Sep. 22, 2003), 3 pages.
"Office Action mailed May 26, 2008", EP Application No. 05109616.2, 5 pages.
"Notice on Division of Application mailed Aug. 8, 2008", CN Application No. 200510113398.0, (Aug. 8, 2008), 2 pages.
"Notice on First Office Action mailed Dec. 12, 2008", CN Application No. 200510113398.0.
"The Second Office Action mailed Jul. 3, 2009", CN Application No. 200510113398.0, 7 pages.
"Notice on Proceeding with the Registration Formalities mailed Oct. 23, 2009", CN Application No. 200510113398.0, 4 pages.
"Examiner's First Report on Application mailed Jun. 4, 2010", AU Application No. 2005222507, 2 pages.
"Notice of Acceptance mailed Oct. 14, 2010", AU Application No. 2005222507, 3 pages.
"Decision on Grant of a Patent for Invention mailed Apr. 29, 2010", Russian Application No. 2005131911, 31 pages.
"Notice of Allowance mailed Nov. 13, 2009", MX Application No. PNa/2005/011088, 2 pages.
"TCG Specification Architecture Overview", Revision 1.2, (Apr. 28, 2004), 55 pages.
"International Search Report and Written Opinion mailed Jun. 19, 2007", PCT Application No. PCT/US05/46091, 11 pages.
"Notice on Grant of Patent Right for Invention mailed Jan. 29, 2010", CN Application No. 200580040764.2, 4 pages.
"Cyotec—Cyolicence" , printed from www.cyotec.com/products/cyoicence on Sep. 7. 2005 (Copyright 2003-2005).
"Magic Desktop Automation Suite for the Small and Mid-Sized Business", printed from www.remedy.com/soultions/magic_it_suite.htm on Sep. 7, 2005, (Copyright 2005), 4 pages.
"PACE Anti-Piracy Introduction", printed from www.paceap.com/psintro.html on Sep. 7, 2005 (Copyright 2002), 4 pages.
"Office Action mailed Jul. 6, 2009", MX Application No. MX/a/2007/005661, 6 pages.
"Office Action mailed Oct. 1, 2010", MX Application No. MX/a/2007/005661, 3 pages.
"Office Action mailed Mar. 8, 2011", MX Application No. MX/a/2007/005661, 8 pages.
"Notice on Second Office Action mailed Jun. 7, 2010", CN Application No. 200680030846.3, 6 pages.
"Decision on Rejection mailed Sep. 13, 2010", CN Application No. 200680030846.3, 5 pages.
Kwok, Sai H., "Digital Rights Management for the Online Music Business", ACM SlGecom Exchanges, vol. 3, No. 3 (Aug. 2002), pp. 17-24.
"International Search Report and Written Opinion mailed Mar. 21, 2007", Application No. PCT/US05/46223, 10 pages.
"The First Office Action mailed Oct. 9, 2009", CN Application No. 200580043102.0, 20 pages.
"Notice of Rejection mailed Jun. 13, 2011", JP Application No. 2007-551270, 4 pages.
"International Search Report and Written Opinion mailed Jul. 9, 2008", Application No. PCT/US05/46539, 11 pages.
"Notice of the First Office Action mailed Dec. 29, 2010", CN Application No. 200580044294.7, 9 pages.
"Office Action mailed Jul. 1, 2009", MX Application No. 2007/a/2007/007441.
"European Search Report mailed Aug. 31, 2011", EP Application No. 05855148.2, 6 pages.
"International Search Report and Written Opinion mailed Sep. 25, 2007", Application No. PCT/US06/12811, 10 pages.
"Examiner's First Report mailed Sep. 15, 2009", AU Application No. 2006220489, 2 pages.
"Notice of Acceptance mailed Jan. 25, 2010", AU Application No. 2006220489, 2 pages.
"The First Office Action mailed Aug. 22, 2008", CN Application No. 200680006199.2, 23 pages.
"The Second Office Action mailed Feb. 20, 2009", CN Application No. 200680006199.2, 9 pages.
"The Fourth Office Action mailed Jan. 8, 2010", CN Application No. 200680006199.2, 10 pages.
"The Fifth Office Action mailed Jul. 14, 2010", CN Application No. 200680006199.2, 6 pages.
"Final Office Action mailed Feb. 7, 2011", U.S. Appl. No. 11/152,214, 15 pages.

(56) References Cited

OTHER PUBLICATIONS

"Non-Final OA Mailed Aug. 30, 2010", U.S. Appl. No. 11/152,214, 12 pages.
"International Search Report and Written Opinion mailed Jan. 16, 2007", Application PCT/US2006/034622, 6 pages.
"Final Office Action mailed May 11, 2010", U.S. Appl. No. 11/152,214, 23 pages.
"Non-Final Office Action mailed Jul. 30, 2009", U.S. Appl. No. 11/152,214, 17 pages.
"Final Office Action mailed Nov. 18, 2008", U.S. Appl. No. 11/152,214, 16 pages.
"Non-Final Office Action mailed Apr. 15, 2008", U.S. Appl. No. 11/152,214, 14 pages.
"Non-Final Office Action mailed Mar. 17, 2011", U.S. Appl. No. 11/022,493, 11 pages.
"Final Office Action mailed Jun. 18, 2010", U.S. Appl. No. 11/022,493, 13 pages.
"Non-Final Office Action mailed May 27, 2009", U.S. Appl. No. 11/022,493, 13 pages.
"Advisory Action mailed Sep. 10, 2008", U.S. Appl. No. 11/022,493, 2 pages.
"Final Office Action mailed Jun. 11, 2008", U.S. Appl. No. 11/022,493, 12 pages.
"Advisory Action mailed Jul. 12, 2007", U.S. Appl. No. 11/022,493, 3 pages.
"Final Office Action mailed Mar. 30, 2007", U.S. Appl. No. 11/022,493, 9 pages.
"International Search Report and Written Opinion mailed Nov. 30, 2006", Application Serial No. PCT/US05/40950, 8 pages.
"Non-Final Office Action mailed Oct. 5, 2006", U.S. Appl. No. 11/022,493, 11 pages.
"Advisory Action mailed Jan. 31, 2011", U.S. Appl. No. 11/006,837, 3 pages.
"Final Office Action mailed Nov. 18, 2010", U.S. Appl. No. 11/006,837, 22 pages.
"Non-Final Office Action mailed May 12, 2010", U.S. Appl. No. 11/006,837, 27 pages.
"Advisory Action mailed Mar. 1, 2010", U.S. Appl. No. 11/006,837, 3 pages.
"Final Office Action mailed Nov. 10, 2009", U.S. Appl. No. 11/006,837, 24 pages.
"Non-Final Office Action mailed Apr. 10, 2009", U.S. Appl. No. 11/006,837, 18 pages.
"Notice of Allowance mailed Jun. 18, 2009", U.S. Appl. No. 10/989,122, 14 pages.
"Non-Final Office Action mailed Feb. 4, 2009", U.S. Appl. No. 10/989,122, 13 pages.
"Non-Final Office Action mailed Aug. 6, 2008", U.S. Appl. No. 10/989,122, 12 pages.
"Non-Final Office Action mailed Jan. 16, 2008", U.S. Appl. No. 10/989,122, 10 pages.
"Final Office Action mailed Mar. 28, 2007", U.S. Appl. No. 10/989,122, 22 pages.
Qiao, Daji et al., "MiSer: An Optimal Low-Energy Transmission Strategy for IEEE 802.11 a/h", obtained from ACM, (Sep. 2003), pp. 161-175.
"Non-Final Office Action mailed Aug. 24, 2006", U.S. Appl. No. 10/989,122, 20 pages.
"Achieving Peak Performance: Insights from a Global Survey on Credit Risk and Collections Practices," CGI Group Pamphlet, pp. 1-11 (2002, 2004).
"Equifax Business Solutions—Manage Your Customers," three pages printed from http://www.equifax.com/sitepages/biz/smallbiz/?sitepage=managecustomers on Oct. 14, 2005.
"Prequalification Using Credit Reports," two pages printed from http:/lwww.credco.com/creditreports/prequalification.html on Oct. 14, 2005.
"Third Office Action in China Patent Application No. 200580044294.7", Mailed Date: Aug. 30, 2013, Filed Date: Dec. 20, 2005, 9 pages.
"Final Rejection in China Patent Application No. 200580044294.7", Mailed Date: Jan. 24, 2014, Filed Date: Dec. 20, 2005, 9 pages.
"Notice of Preliminary Rejection mailed May 30, 2012", Korean Patent Application No. 10-2007-7011069, 1 page.
Mois, Dan et al., "Reconfiguration Security for Hardware Agents in Testing", Automation Quality and Testing Robotics (AQTR), 2010 IEEE International Conference on vol. 2, (2010), pp. 1-5.
Zhang, Kai et al., "Reconfigurable Security Protection System Based on Net FPGA and Embedded Soft-Core Technology", Computer Design and Applications (ICCDA), 2010 International Conference on Volume, (2010), pp. V5-540-V5-544.
Ooi, Joo G., et al., "A Proof of Concept on Defending Cold Boot Attack", Quality Electronic Design, ASQED 2009, $1^{st}$ Asia Symposium, (2009), pp. 330-335.
U.S. Appl. No. 13/367,198, Non-Final Office Action Mailed Aug. 6, 2014, 14 pages.
India Application No. 2739/DEL/2005, First Examination Report Mailed Sep. 19, 2014, 1 page.
China Application No. 200580044294.7, Response to Jan. 24, 2014 Final Office Action filed May 5, 2014, 13 pages.
International Search Report and Written Opinion for PCT/US2008/067466 Mailed Dec. 26, 2008, 7 pages.
Bloom, et al., "Copy Protection for DVD Video", Proceedings of the IEEE, vol. 87, No. 7, Jul. 1999, 11 pages.
"Office Action Received for Canada Patent Application No. 2505295", Mailed Date: Nov. 19, 2013, Filed Date: Apr. 22, 2005, 4 Pages.
"First Examination Received for Indian Patent Application No. 892/DEL/2005", Mailed Date: Sep. 13, 2013, Filed Date: Apr. 7, 2005, 2 Pages.
"Second Examination Report Received for Indian Patent Application No. 892/DEL/2005", Mailed Date: Jan. 28, 2014, Filed Date: Apr. 7, 2005, 2 Pages.
European Search Report for EP05102765.4 Mailed Oct. 13, 2006, 3 pages.
EP05102765.4, Office Action Mailed Nov. 19, 2007, 7 pages.
EP05102765.4, Response to Office Action Mailed Nov. 19, 2007, filed May 26, 2008, 20 pages.
CN200510066707.3, First Office Action Mailed Dec. 29, 2007, 8 pages.
CN200510066707.3, Response to First Office Action Mailed Dec. 29, 2007, filed Apr. 15, 2008, 52 pages.
Response to Office Action Received for Canada Patent Application No. 2505295, Mailed Date: Nov. 19, 2013, Response Filed Date: May 20, 2014, 10 Pages.
Office Action mailed Nov. 19, 2013, from Canadian Patent Application No. 2505295, 4 Pages.
Office Action mailed Oct. 30, 2009, from Russian Patent Application No. 2005131911. 7 Pages.
Office Action mailed Oct. 9, 2009, from Chinese Patent Application No. 200580043102.0. 20 Pages.
Official Action mailed Jul. 15, 2010, from European Patent Application No. 05855148.2. 2 Pages.
Partial Search Report mailed Jul. 23, 2010, from European Patent Application No. 05820177.3. 3 Pages.
Partial Search Report mailed Jul. 23, 2010, from European Patent Application No. 05821183.0. 3 Pages.
Pre-appeal Examination mailed Jun. 12, 2012, from Japanese Patent Application No. 5173436. 2 Pages.
Preliminary Amendment filed Dec. 11, 2012, from U.S. Appl. No. 13/711,549. 5 Pages.
Preliminary Amendment filed Dec. 24, 2014, from U.S. Appl. No. 13/711,549. 8 Pages.
Preliminary Amendment filed Nov. 14, 2005, from U.S. Appl. No. 11/224,635. 6 Pages.
Preliminary Amendment filed Nov. 3, 2005, from U.S. Appl. No. 11/227,045. 4 Pages.
Prosecution File Wrapper of U.S. Appl. No. 10/966,428, filed Oct. 15, 2004. 79 Pages.
Prosecution File Wrapper of U.S. Appl. No. 10/968,462, filed Oct. 18, 2004. 35 Pages.
Prosecution File Wrapper of U.S. Appl. No. 10/982,941, filed Nov. 4, 2004. 95 Pages.

(56) References Cited

OTHER PUBLICATIONS

Prosecution File Wrapper of U.S. Appl. No. 10/982,962, filed Nov. 3, 2004. 70 Pages.
Prosecution File Wrapper of U.S. Appl. No. 11/007,089, filed Dec. 8, 2004. 134 Pages.
Prosecution File Wrapper of U.S. Appl. No. 11/018,095, filed Dec. 20, 2004. 210 Pages.
Prosecution File Wrapper of U.S. Appl. No. 11/020,329, filed Dec. 22, 2004. 44 Pages.
Prosecution File Wrapper of U.S. Appl. No. 11/034,377, filed Jan. 12, 2005. 156 Pages.
Prosecution File Wrapper of U.S. Appl. No. 11/039,165, filed Jan. 19, 2005. 120 Pages.
Prosecution File Wrapper of U.S. Appl. No. 11/040,968, filed Jan. 21, 2005. 153 Pages.
Prosecution File Wrapper of U.S. Appl. No. 11/057,266, filed Feb. 14, 2005. 26 Pages.
Prosecution File Wrapper of U.S. Appl. No. 11/074,500, filed Mar. 8, 2005. 48 Pages.
Prosecution File Wrapper of U.S. Appl. No. 11/074,558, filed Mar. 8, 2005. 86 Pages.
Prosecution File Wrapper of U.S. Appl. No. 11/087,263, filed Mar. 23, 2005, 104 Pages.
Prosecution File Wrapper of U.S. Appl. No. 11/092,041, filed Mar. 29, 2005. 62 Pages.
Prosecution File Wrapper of U.S. Appl. No. 11/109,438, filed Apr. 19, 2005. 34 Pages.
Prosecution File Wrapper of U.S. Appl. No. 11/191,448, filed Jul. 28, 2005. 147 Pages.
Response filed Feb. 12, 2010 to Non-Final Office Action dated Apr. 10, 2009, from U.S. Appl. No. 11/006,837. 16 Pages.
Response filed Feb. 13, 2012 and English translation of claims as filed, from Japanese Patent Application No. 2005-301957. 9 Pages.
Response filed Feb. 27, 2014 to Non-Final Office Action dated Dec. 5, 2013, from U.S. Appl. No. 13/711,549. 10 Pages.
Response filed Jan. 13, 2011 to Final Office Action dated Nov. 18, 2010, from U.S. Appl. No. 11/006,837. 11 Pages.
Response filed Jan. 21, 2011 to Non-Final Office Action dated Jul. 21, 2010, from U.S. Appl. No. 11/147,539. 10 Pages.
Response filed Jan. 30, 2013 to Non-Final Office Action dated Oct. 3, 2012, from U.S. Appl. No. 11/227,045. 13 Pages.
Response filed Jan. 31, 2011 to Final Office Action dated Jul. 30, 2010, from U.S. Appl. No. 11/224,635. 9 Pages.
Response filed Jan. 5, 2010, from Chinese Patent Application No. 200680030846.3. 11 Pages.
Response filed Jan. 7, 2008, from European Patent Application No. 05110697.9. 6 Pages.
Response filed Jan. 8, 2007 to Non-Final Office Action dated Oct. 5, 2006, from U.S. Appl. No. 11/022,493. 17 Pages.
Response filed Jul. 2, 2007, to Final Office Action dated Mar. 30, 2007, from U.S. Appl. No. 11/022,493. 7 Pages.
Response filed Jul. 21, 2009 to Non-Final Office Action dated Apr. 10, 2009, from U.S. Appl. No. 11/006,837. 14 Pages.
Response filed Jul. 23, 2010 to Final Office Action dated Apr. 1, 2010, from U.S. Appl. No. 11/227,045. 12 Pages.
Response filed Jun. 23, 2010 to Non-Final Office Action dated Mar. 23, 2010, from U.S. Appl. No. 11/224,635. 5 Pages.
Response filed Jun. 28, 2011 to Non-Final Office Action dated Apr. 21, 2011, from U.S. Appl. No. 11/224,635. 10 Pages.
Response filed Jun. 29, 2011 to Final Office Action dated Apr. 1, 2011, from U.S. Appl. No. 11/147,539. 11 Pages.
Response filed Mar. 11, 2010, from Chinese Patent Application No. ZL200680006199.2. 7 Pages.
Response filed Mar. 12, 2012 to Non-Final Office Action dated Dec. 12, 2011, from U.S. Appl. No. 10/988,907. 11 Pages.
Response filed Mar. 13, 2008 to Non-Final Office Action dated Nov. 14, 2007, from U.S. Appl. No. 11/022,493. 8 Pages.
Response filed Mar. 19, 2007, from European Patent Application No. 05110697.9. 7 Pages.
Response filed Mar. 19, 2010 to Non-Final Office Action dated Jan. 27, 2010, from U.S. Appl. No. 11/022,493. 4 Pages.
Response filed Mar. 6, 2012, from Japanese Patent Application No. 2008-528054. 7 Pages.
Response filed Mar. 9, 2011 to Final Office Action dated Dec. 9, 2010, from U.S. Appl. No. 10/988,907. 9 Pages.
Response filed May 18, 2009 to Final Office Action dated Nov. 18, 2008, from U.S. Appl. No. 11/152,214. 7 Pages.
Response filed May 18, 2011 to Non-Final Office Action dated Mar. 17, 2011, from U.S. Appl. No. 11/022,493. 10 Pages.
Response filed May 19, 2010, from European Patent Application No. 5819896.1. 4 pages.
Response filed May 22, 2009 to Non-Final Office Action dated Feb. 18, 2009, from U.S. Appl. No. 11/147,539. 13 Pages.
Response filed May 25, 2010 to Non-Final Office Action dated Mar. 4, 2010, from U.S. Appl. No. 10/988,907. 7 Pages.
Response filed May 5, 2015, from Indian Patent Application No. 3406/DELNP/2007. 12 Pages.
Blissmer, R., "Next Step is Encryption: Data Security May be Bundled with Next's Operating System", Electronic Engineering Times, (Feb. 3, 1992), 2 pages.
Cassidy, "A Web Developers Guide to Content Encapsulation Technology", Netscape World, (Apr. 1997), 7 pages.
Chin, T., "Reaching Out to Physicians", Health Data Management, vol. 6, No. 9, pp. 36, 38, 40, (Sep. 1998), 3 pages.
Clark, T., "Software Secures Digital Content on Web", Interactive Week, (Sep. 25, 1995), 1 page.
Cox, B., "Superdistribution", Wired Magazine, Idea Fortes, (Sep. 1994), 5 pages.
Cox, B. "What If There is a Silver Bullet", J. Object Oriented Program, (Jun. 1992), 5 pages.
Dawson, F., "S-A Unveil Security System", Multichannel News, Broadband Week, vol. 18, No. 3, pp. 45 & 47, (Jan. 15, 1996), 2 pages.
Evans, P., "DRM: Is the Road to Adoption Fraught with Potholes?", Seybold Reporting Analyzing Publishing Technologies, Oct. 22, 2001, 1(14), p. 32, 2 pages.
Finnie, et al., "Suppliers Cashing in on the Internet", Communications Week International, No. 134, p. 36-37, (Nov. 14, 1994), 2 pages.
Fowler, T., "Technology's Changing Role in Intellectual Property Rights", IT Professional (IEEE), Mar./Apr. 2002, 4(2), 39-44, 6 pages.
Gable, J., "The Digital Rights Conundrum", Transform Magazine, 2001, 10(11), 27, 2 pages.
Griswold, G.N., "A Method for Protecting Copyright on Networks", IMA Intellectual Property Project Proceedings, vol. 1, Issue 1, pp. 111-120, (Jan. 1994), 11 pages.
Gunter, et al., "Models and Languages for Digital Rights", Proceedings of the 34th Annual Hawaii International Conference on System Sciences, 2001, 5 pages.
Hanai, H., "Latest Information and Establishment of a Server-Setting Up Free", BSD-UNIX User, vol. 11, No. 3, Softbank Pub. Co, Japan, (Mar. 1, 2002), 15 pages.
Hauser, R., "Does Licensing Require New Access Control Techniques?", Communications of the ACM, vol. 37, No. 11, (Nov. 1994), 8 pages.
Hong, et al., "On the Construction of a Powerful Distributed Authentication Server Without Additional Key Management", Computer Communications, 2000, 23, 8 pages.
Housley, et al., "Internet X. 509 Public Key Infrastructure Certificate and Certificate Revocation List (CRL) Profile", Standards Track, (Apr. 2002), pp. 1-129, retrieved on Apr. 19, 2012, 129 pages.
Housley, et al., "Metering: A Pre-Pay Technique", Proceedings of the SPIE-The International Society for Optical Engineering, 3022, (Feb. 13, 1997), p. 527, 2 pages.
Hudgins-Bonafield, C., "Selling Knowledge on the Net", Network Computing, pp. 102-109, (Jun. 1, 1995), 5 pages.
Hwang, et al., "Protection of Digital Contents on Distributed Multimedia Environment", Proceedings of the IASTED International Conference and Multimedia Systems and Apps, Nov. 19-23, 2000, Las Vegas, NV, pp. 127-132, 5 pages.
Jakobsson, et al., "Proprietary Certificates", Topics in Cryptology, 2002, pp. 164-181, 18 pages.

(56) References Cited

OTHER PUBLICATIONS

Kahn, R., "Deposit, Registration, and Recordation in an Electronic Copyright Management System", IMA Intellectual Property Project Proceedings, (Jan. 1994), 6 pages.
Kaliski, "Privacy Enhancement for Internet Electronic Mail: Part IV: Key Certification and Related Services", Network Working Group, RFC 1424, pp. 1-9, (Feb. 1993), 9 pages.
Kaplan, M., "IBM Dyptolopes", Super-Distribution and Digital Rights Management, (Dec. 1996), 8 pages.
Kent, S., "Protecting Externally Supplied Software in Small Computers", 1-42 and 250-252, (Sep. 1980), 256 pages.
Kohl, et al., "Safeguarding Digital Library Contents and Users: Protecting Documents Rather Than Channels", D-LIB Magazine, (Sep. 1997), 10 pages.
Kopeikin, R., "Secure Trading on the Net", Telecommunications International Edition, vol. 30, No. 10, pp. 89-94, (Oct. 1996), 4 pages.
Kuan-Ting, S., "A New Digital Watermarking Technique for Video", Proceedings VISUAL 2002, Hsin Chu, Taiwan, Mar. 11-13, 2002, 2 pages.
Kumik, P., "Digital Rights Management", Computers and Law, 2000, 11(4), pp. 14-15, 2 pages.
Notice of Allowance mailed Sep. 17, 2014, from U.S. Appl. No. 13/711,549. 8 Pages.
Notice of Divisional mailed Aug. 8, 2008, from Chinese Patent Application No. 2005-10113398.0. 24 Pages.
Notice of Fifth Office Action mailed Jul. 14, 2010, from Chinese Patent Application No. ZL200680006199.2. 6 Pages.
Notice of First Office Action mailed Aug. 22, 2008, from Chinese Patent Application No. ZL200680006199.2. 23 Pages.
Notice of Fourth Office Action mailed Jan. 8, 2010, from Chinese Patent Application No. ZL200680006199.2. 10 Pages.
Notice of Preliminary Examination mailed Aug. 22, 2008, from Chinese Patent Application No. 200580038773.8. 2 Pages.
Notice of Preliminary Rejection and Translation mailed Dec. 21, 2012, from Korean Patent Application No. 10-2007-7013731. 4 Pages.
Notice of Preliminary Rejection and Translation mailed Jun. 27, 2012, from Korean Patent Application No. 10-2007-7013731. 4 Pages.
Notice of Preliminary Rejection and Translation mailed May 31, 2012, from Korean Patent Application No. 10-2007-7011069. 4 Pages.
Notice of Rejection mailed Feb. 10, 2012, from Japanese Patent Application No. 2005-330496. 5 Pages.
Notice of Rejection and Translation mailed Jul. 8, 2011 from Japanese Patent Application No. 2007-41363. 10 Pages.
Notice of Rejection mailed Nov. 11, 2011, from Japanese Patent Application No. 2005-301957. 21 Pages.
Notice of Rejection mailed Oct. 28, 2011, from Japanese Patent Application No. 2008-531182. 13 Pages.
Notice of Rejection and Translation mailed Sep. 9, 2011, from Japanese Patent Application No. 2007-548385. 9 Pages.
Notice of Second Office Action mailed Feb. 20, 2009, from Chinese Patent Application No. ZL200680006199.2. 9 Pages.
Notice of Third Office Action mailed Jun. 5, 2009, from Chinese Patent Application No. ZL200680006199.2. 7 Pages.
Notice on Grant of Patent mailed Oct. 20, 2010, from Chinese Patent Application No. ZL200680006199.2. 4 Pages.
Notice re Non-Compliant Amendment mailed Jan. 27, 2010, from U.S. Appl. No. 11/022,493. 3 Pages.
Office Action mailed Feb. 9, 2010, from Mexican Patent Application No. Mx/a/2007/005655. 8 Pages.
Office Action mailed Jun. 30, 2010, from Japanese Patent Application No. 2000608242. 1 Page.
Office Action mailed Mar. 19, 2010, from European Patent Application No. 05819896.1. 1 Page.
Office Action mailed Mar. 27, 2009, from U.S. Appl. No. 11/150,001. 11 Pages.
Office Action mailed Mar. 8, 2012, from European Patent Application No. 05109616.2. 6 Pages.
Office Action mailed May 21, 2013, from European Patent Application No. 05855148.2. 9 Pages.
Office Action mailed May 26, 2008, from European Patent Application No. 05109616.2. 5 Pages.
Non-Final Rejection mailed Jul. 23, 2013, from U.S. Appl. No. 13/711,549. 7 Pages.
Notice of Acceptance mailed Jan. 25, 2010, from Australian Patent Application No. 2006220489, 2 Pages.
Notice of Acceptance mailed Oct. 14, 2010, from Australian Patent Application No. 2005222507, 3 Pages.
Notice of Allowance and allowed claims mailed Dec. 18, 2012, from Japanese Patent Application No. 5173436. 8 Pages.
European Search Report mailed Jan. 11, 2008, from European Patent Application No. 05820090.8, 7 Pages.
Prosecution File Wrapper of U.S. Appl. No. 11/210,611, filed Aug. 24, 2005. 32 Pages.
Prosecution File Wrapper of U.S. Appl. No. 11/224,635, filed Sep. 12, 2005. 138 Pages.
Prosecution File Wrapper of U.S. Appl. No. 11/202,838, filed Aug. 12, 2005. 109 Pages.
Prosecution File Wrapper of U.S. Appl. No. 11/321,668, filed Dec. 29, 2005. 22 Pages.
Prosecution File Wrapper of U.S. Appl. No. 11/612,436, filed Dec. 18, 2006. 26 Pages.
Prosecution File Wrapper of U.S. Appl. No. 90/011,186, filed Aug. 25, 2010. 64 Pages.
Provision of the Minutes mailed Feb. 15, 2008, from European Patent Application No. 05110697.9. 35 Pages.
Request for Examination and Voluntary Amendment filed Mar. 8, 2011, from Canadian Patent Application No. 2597231. 15 Pages.
Request for Reexamination, Amended Claims and Translation of Amended Claims filed Apr. 3, 2014, from Chinese Patent Application No. 200580044294.7. 14 Pages.
Response filed Apr. 15, 2009, from Chinese Patent Application No. ZL200680006199.2. 9 Pages.
Response filed Apr. 4, 2013, from Canadian Patent Application No. 2597231. 6 Pages.
Amendment/Response filed Aug. 2, 2010, to Final Office Action dated May 11, 2010, from U.S. Appl. No. 11/152,214. 6 Pages.
Amendment/Response filed Aug. 25, 2008, to Final Office Action dated Jun. 11, 2008, from U.S. Appl. No. 11/022,493. 16 Pages.
Amendment/Response filed Aug. 30, 2007, to Final Office Action dated Mar. 30, 2007, from U.S. Appl. No. 11/022,493. 5 Pages.
Response filed Aug. 30, 2010, from Chinese Patent Application No. ZL200680006199.2. 8 Pages.
Response filed Aug. 5, 2009, to Non-Final Office Action dated May 5, 2009, from U.S. Appl. No. 11/224,635. 8 Pages.
Amendment in Response filed Aug. 7, 2008, to Non-Final Office Action dated Apr. 15, 2008, from U.S. Appl. No. 11/152,214. 11 Pages.
Amendment/Response filed Dec. 1, 2010 to Office Action dated Aug. 30, 2010, from U.S. Appl. No. 11/152,214. 5 Pages.
Response filed Dec. 17, 2007, from European Patent Application No. 05110697.9. 29 Pages.
Response filed Dec. 17, 2009, to Non-Final Office Action dated Aug. 25, 2009, from U.S. Appl. No. 11/227,045. 10 Pages.
Response filed Dec. 17, 2010, to Final Office Action dated Jun. 18, 2010, from U.S. Appl. No. 11/022,493. 5 Pages.
Response filed Dec. 18, 2008, from Japanese Patent Application No. 2007-548385. 3 Pages.
Response filed Dec. 21, 2009, from Australian Patent Application No. 2006220489. 14 Pages.
Response filed Dec. 23, 2008, from Chinese Patent Application No. ZL200680006199.2. 8 Pages.
Response filed Dec. 23, 2011, from European Patent Application No. 05855148.2. 16 Pages.
Amendment in Response filed Dec. 28, 2009, to Final Office Action dated Sep. 29, 2009, from U.S. Appl. No. 11/224,635. 9 Pages.
Response filed Dec. 5, 2008, to Office Action dated May 26, 2008, from European Patent Application No. 05109616.2. 25 Pages.
Response filed Dec. 9, 2008, to Restriction Requirement dated Nov. 12, 2008, from U.S. Appl. No. 10/988,907. 1 Pages.

(56) References Cited

OTHER PUBLICATIONS

Response filed Dec. 9, 2011, from Japanese Patent Application No. 2007-548385. 8 Pages.
Response filed Feb. 1, 2010, to Non-Final Office Action dated Jul. 30, 2009, from U.S. Appl. No. 11/152,214. 9 Pages.
Examiner Interview Summary Record mailed Jul. 25, 2008, from U.S. Appl. No. 11/152,214. 2 Pages.
Examiner Interview Summary Record mailed Jul. 29, 2010, from U.S. Appl. No. 11/227,045. 3 Pages.
Examiner Interview Summary Record mailed Jul. 31, 2009, from U.S. Appl. No. 11/224,635. 2 Pages.
Examiner Interview Summary Record mailed Jun. 21, 2011, from U.S. Appl. No. 11/224,635. 3 Pages.
Examiner Interview Summary Record mailed Jun. 30, 2011, from U.S. Appl. No. 11/147,539. 5 Pages.
Examiner Interview Summary Record mailed Mar. 28, 2011, from U.S. Appl. No. 11/152,214. 4 Pages.
Examiner Interview Summary Record mailed Mar. 7, 2011, from U.S. Appl. No. 11/006,837. 3 Pages.
Examiner Interview Summary Record mailed May 10, 2011, from U.S. Appl. No. 11/022,493. 4 Pages.
Examiner's First Report mailed Jun. 7, 2010, from Australian Patent Application No. 2005222507. 2 Pages.
Examiner's First Report mailed Sep. 15, 2009, from Australian Patent Application No. 2006220489. 2 Pages.
Extended European Search Report mailed Aug. 31, 2011, from European Patent Application No. 05855148.2. 6 Pages.
Extended European Search Report mailed Dec. 21, 2011, from European Patent Application No. 05854752.2. 7 Pages.
Extended Search Report mailed Dec. 6, 2010, from European Patent Application No. 051820177.3. 8 Pages.
Extended Search Report mailed Jan. 2, 2008, from European Patent Application No. 05109616.2. 7 Pages.
Extended Search Report mailed Jan. 21, 2010, from European Patent Application No. 05819896.1. 8 Pages.
Extended Search Report mailed Jan. 7, 2011, from European Patent Application No. 05821183.0. 9 Pages.
File Wrapper Prosecution of U.S. Appl. No. 11/021,021, filed Dec. 23, 2004. 58 Pages.
Final Notice of Rejection mailed Jun. 8, 2012, from Japanese Patent Application No. 2005-301957. 17 Pages.
Final Office Action mailed Apr. 1, 2010, from U.S. Appl. No. 11/227,045. 14 Pages.
Final Office Action mailed Sep. 29, 2009, from U.S. Appl. No. 11/224,635. 9 Pages.
Final Office Action mailed Apr. 1, 2011, from U.S. Appl. No. 11/147,539. 29 Pages.
Final Office Action mailed Aug. 10, 2011, from U.S. Appl. No. 11/022,493. 18 Pages.
Final Office Action mailed Dec. 9, 2010, from U.S. Appl. No. 10/988,907. 7 Pages.
Final Office Action mailed Jul. 30, 2010, from U.S. Appl. No. 11/224,635. 11 Pages.
Final Office Action mailed Jul. 6, 2009, from U.S. Appl. No. 11/147,539. 25 Pages.
Extended European Search Report mailed Dec. 6, 2010, from European Patent Application No. 05820177.3. 8 Pages.
First Office Action mailed Aug. 21, 2009, from Chinese Patent Application No. 200680030846.3, 8 Pages.
Notice of Allowance mailed Nov. 3, 2010, from Chinese Patent Application No. 200680006199.2. 4 Pages.
Office Action mailed Dec. 3, 2009, from Russian Patent Application No. 2005131911. 7 Pages.
Response filed May 6, 2011, to Final Office Action dated Feb. 7, 2011, from U.S. Appl. No. 11/152,214. 11 Pages.
Response filed Nov. 10, 2011, to Final Office Action dated Aug. 10, 2011, from U.S. Appl. No. 11/022,493. 11 Pages.
Response filed Nov. 14, 2013, to Non-Final Office Action dated Jul. 23, 2013, from U.S. Appl. No. 13/711,549. 10 Pages.

Response filed Nov. 29, 2013, from European Patent Application No. 05855148.2. 15 Pages.
Response filed Nov. 5, 2009, to Final Office Action dated Jul. 6, 2009, from U.S. Appl. No. 11/147,539. 12 Pages.
Response filed Nov. 7, 2008, to Final Office Action dated Jun. 11, 2008, from U.S. Appl. No. 11/022,493. 17 Pages.
Response filed Oct. 20, 2009, to Non-Final Office Action dated May 27, 2009, from U.S. Appl. No. 11/022,493. 5 Pages.
Response filed Oct. 6, 2011, from Japanese Patent Application No. 2007-541363. 9 Pages.
Response filed Sep. 13, 2010, to Non-Final Office Action dated May 12, 2010, from U.S. Appl. No. 11/006,837. 12 Pages.
Response filed Sep. 19, 2011, to Non-Final Office Action dated Sep. 1, 2011, from U.S. Appl. No. 11/147,539. 9 Pages.
Response filed Sep. 22, 2010, to Non-Final Office Action dated Aug. 5, 2010, from U.S. Appl. No. 10/988,907. 8 Pages.
Response filed Sep. 22, 2010, from European Patent Application No. 05855148.2. 1 Page.
Response filed Sep. 27, 2010, from Australian Patent Application No. 2005222507. 44 Pages.
Response filed Sep. 6, 2011, to Non-Final Office Action dated Jun. 9, 2011, from U.S. Appl. No. 11/152,214. 13 Pages.
Response to EPO Official Communication filed Jul. 10, 2012, from European Patent Application No. 5854752.2. 15 Pages.
Response to First Office Action filed Apr. 10, 2009, from Chinese Patent Application No. 2005-10113398.0. 20 Pages.
Response to First Office Action filed Apr. 28, 2011, from Chinese Patent Application No. 200580044294.7. 15 Pages.
Response to Notice of Divisional filed Oct. 8, 2008, from Chinese Patent Application No. 2005-10113398.0. 30 Pages.
Response to Partial Search Report filed Oct. 4, 2010, from European Patent Application No. 051820177.3. 2 Pages.
Response to Partial Search Report filed Oct. 4, 2010, from European Patent Application No. 0521183.0. 2 Pages.
Response to Restriction Requirement filed Apr. 16, 2009, from U.S. Appl. No. 11/224,635. 1 Page.
Response to Restriction Requirement filed Feb. 23, 2009, from U.S. Appl. No. 11/022,493. 1 Page.
Response to Second Office Action filed May 6, 2013, from Chinese Patent Application No. 200580044294.7. 5 Page.
Response to Second Office Action filed Sep. 1, 2009, from Chinese Patent Application No. 2005-10113398.0. 34 Page.
Response to Third Office Action filed Nov. 13, 2013, from Chinese Patent Application No. 200580044294.7. 13 Page.
Response, Amendment, Translation of the Response, and Claims filed Feb. 21, 2013, from Korean Patent Application No. 10-2007-7013731. 7 Pages.
Non-Final Office Action mailed Oct. 3, 2012, from U.S. Appl. No. 11/227,045. 14 Pages.
Non-Final Office Action mailed Sep. 1, 2011, from U.S. Appl. No. 11/147,539. 8 Pages.
Response filed Jul. 9, 2013, from U.S. Appl. No. 13/367,198. 12 Pages.
Notice of Allowance mailed Feb. 20, 2015, from U.S. Appl. No. 13/367,198. 11 Pages.
Non-Final Office Action mailed Feb. 25, 2013, from U.S. Appl. No. 13/367,198. 14 Pages.
Letter Restarting Period for Response mailed Feb. 10, 2014, from U.S. Appl. No. 13/367,198. 18 Pages.
Final Rejection mailed Oct. 25, 2013, from U.S. Appl. No. 13/367,198. 15 Pages.
Applicant Initiated Interview Summary mailed Feb. 10, 2014, from U.S. Appl. No. 13/367,198. 2 Pages.
Applicant Initiated Interview Summary mailed Jan. 30, 2014, from U.S. Appl. No. 13/367,198. 3 Pages.
Applicant Initiated Interview Summary mailed Oct. 25, 2013, from U.S. Appl. No. 13/367,198. 2 Pages.
Amendment filed Mar. 11, 2014, from U.S. Appl. No. 13/367,198. 15 Pages.
Response filed Nov. 7, 2014, to Non-Final Office Action dated Aug. 6, 2014, from U.S. Appl. No. 13/367,198. 12 Pages.
Office Action mailed Jun. 3, 2015, from European Patent Application No. 05855148.2. 5 Pages.

(56) References Cited

OTHER PUBLICATIONS

Decision on Reexamination mailed Jul. 30, 2015 from Chinese Patent Application No. 200580044294.7, 10 Pages.
"Aladdin Acquires the Assets of Micro Macro Technologies", from http://www.findarticles.com, Business Wire, (Mar. 3, 1999), 2 pages.
"Aladdin Knowledge Systems Partners with Rights Exchange, Inc. to Develop a Comprehensive Solution for Electronic Software Distribution", (Aug. 3, 1988), 6 pages.
"Bankard Set to Intro Virtual Shopping in Philippines", Dow Jones Factiva, Newsbytes News Network, (Apr. 16, 1997), 2 pages.
"Black Box Crypton Defies the Hackers", Electronics Weekly, n. 1257, p. 26, (Mar. 6, 1985), 2 pages.
"BreakerTech Joins Copyright Management Market", from http://www.findarticles.com, Computergram International, (Aug. 5, 1999), 2 pages.
"Content Protection System Architecture: A Comprehensive Framework for Content Protection", Intel Corporation, 4C Entity, LLC, (Feb. 17, 2000), 19 pages.
"CYLINK: Public-Key Security Technology Granted to the Public; Cylink Announces the Renowned Diffie-Hellman Public-Key Technology Has Entered the Public Domain", Business Wire, (Sep. 16, 1997), 4 pages.
"Finland—Data Fellows Secures Icsa Certification", Newsbytes, (Nov. 7, 1998), 1 page.
"Free On-Line Dictionary of Computing Concatenate", (Dec. 22, 1995), 1 page.
"How to Prevent Copying DB Application to Other Machines", Discussion From Microsoft.Public.Access.Security, (Dec. 22, 1998), 4 pages.
"IBM Spearheading Intellectual Property Protection Technology for Information on the Internet", (May 1, 1996), 2 pages.
"Internet Dynamics: Internet Dynamics First to Ship Integrated Security Solution for Enterprise Intranets and Extranets, Conclave Accelerates Enterprise Deployment of Secure, High-Value Intranets and Extranets", Business Wire, (Sep. 15, 1997), 4 pages.
"LicensIt: Kinder, Gentler Copyright?", Copyright Management System Links Content, Authorship Information, Seybold Report on Desktop Publishing, 10(11), (1996), 2 pages.
"Managing Digital Rights in Online Publishing", How Two Publishing Houses Maintain Control of Copyright, Information Management & Technology, 2001, 34(4), pp. 168-169, 2 pages.
"Optimising License Checkouts from a Floating License Server", ARM the Architecture for the Digital World, from http://www.arm.com/support/faqdev11391.html, (Sep. 9, 2008), 2 pages.
"Overview of Security of Windows Media Rights Manager", Microsoft Corporation, http://msdn.microsoft.com/ja-jp/library/dd148624.aspx, (Dec. 3, 2001), 7 pages.
"Postal Service Announces Plan to Postmarks on Electronic Mail", San Jose Mercury News, (Apr. 9, 1995), 2 pages.
"Rights Management in the Digital Age: Tradings in Bits, Not Atoms", No. 4, (Spring 1997), 3 pages.
"Solution for Piracy", Which Computer?, p. 29, (Nov. 1983), 4 pages.
"Sony Develops Copyright Protection Solutions for Digital Music Content", PR Newswire (copied from http://www.findarticles.com)., (Feb. 25, 1999), 2 pages.
"Technological Solutions Rise to Complement Law's Small Stick Guarding Electronic Works", Information Law Alert, 3-4 and 7, (Jun. 16, 1995), 3 pages.
"The New Network: Planning and Protecting Intranet Electronic Commerce", Information Week, No. 608, (12/211996), 7 pages.
Ahuja, G., "The Key to Keys", Dataquest (India), (Aug. 31, 1997), pp. 140-143, 4 pages.
Amdur, D., "InterTrust Challenges IBM Digital Content Metering", Report on Electronic Commerce, 3(15), 1-2 and 16-18, (Jul. 23, 1996), 5 pages.
Amdur, D., "Meeting Online Copyright", (Jan. 16, 1996), 2 pages.
Arbaugh, "A Secure and Reliable Bootstrap Architecture", IEEE Symposium on Security and Privacy, May 1997, pp. 65-71, 6 pages.
Armati, D., "Tools and Standards for Protection, Control and Presentation of Data", (Apr. 3, 1996), 18 pages.
Backman, D., "Smartcards: The Intelligent Way to Security", Network Computing, vol. 9, No. 9, pp. 168-171, (May 15, 1998), 2 pages.
Bajikar, S., "Trusted Platform Module (TPM) based Security on Notebook PCs—White Paper", Mobile Platforms Group Intel Corporation; <<http://www.intel.com/design/mobile/platform/downloads/ Trusted_Platform_Module_White_Paper.pdf>>, (6/20/02). 20 pages.
Benjamin, R., et al., "Electronic Markets and Virtual Value Chains on the Information Superhighway", Sloan Management Rev., 62-72, (Winter 1995), 12 pages.
Linn, "Privacy Enhancement for Internet Electronic Mail: Part I: Message Encryption and Authentication Procedures", Network Working Group, RFC 1421, pp. 1-37, (Feb. 1993), retrieved on Apr. 19, 2012, 37 pages.
Linn, "Copyright and Information Services in the Context of the National Research and Educational Network", IMA Intel. Property Project Proceedings, 1(1), 1 and 10-20, (Jan. 1994), 13 pages.
Lotspiech, "Broadcast Encryption's Bright Future", IEEE Computer, Aug. 2002, pp. 57-63, 7 pages.
Malamud, "Network-Based Authentication: The Key to Security", Network Computing, pp. 98-100, (Jun. 1991), 3 pages.
McNab, "Super-Distribution Works Better in Practical Applications", (Mar. 21, 1998), 2 pages.
Memon, et al., "Protecting Digital Media Content", Communications of the ACM, Jul. 2002, pp. 35-43, 9 pages.
Menezes, et al., "Handbook of Applied Cryptography", 1997, CRC Press, pp. 31-32, 2 pages.
Moeller, "IBM Takes Charge of E-Commerce", Plans Client, Servers Apps based on Set, Apr. 1996, 5 pages.
Moeller, "NetTrust Lets Cyberspace Merchants Take Account", PC Week, 12(48), Nov. 20, 1995, 1 page.
Morales, "Understanding Your Credit Score", http://www.cbsnews.com/stories/2003/04/29/earlyshow/contributors/raymartin/main55152.shtml, retrieved from the Internet on Apr. 23, 2009, (Apr. 30, 2003), 3 pages.
Oda, "The Basics and Application of Security IC Cards—Passport to an E-Business", 1st ed., C. Media Co., Ltd., (Apr. 27, 2000), 16 pages.
Ogata, et al., "Provably Secure Metering Scheme", Advances in Cryptology_ASIACRYPT, 6th International Conference on the Theory and Application of Cryptology and Information Security Proceedings, (Lecture notes in Computer Science 1976), 2000, pp. 388-398, 11 pages.
Oh, et al., "Acceleration Technique for vol. Rendering Using 2D Texture Based Ray Plane Casting on GPU", 2006 Intl. Conf. CIS, Nov. 3-6, 2006, pp. 1755-1758, 4 pages.
Olson, et al., "Concurrent Access Licensing", pp. 67-74, UNIX Review, vol. 6, No. 9, (Sep. 1988), 6 pages.
Peinado, "Digital Rights Management in a Multimedia Environment", SMPTE Journal, 2002, 111(3), pp. 159-163, 6 pages.
Pemberton, "An Online Interview with Jeff Crigler at IBM InfoMarket", Jul. 1996, 8 pages.
Pruneda, "Using Windows Media Rights Manager to Protect and Distribute Digital Media", Windows Media Technologies, http://msdn.microsoft/msdnmag/issues101/12/Drm/printasp, (Dec. 1, 2001), 18 pages.
Pruneda, "Windows Media Technologies: Using Windows Media Rights Manager to Protect and Distribute Digital Media", MSDN Magazine Japanese Version, Ascii Corporation, Japan, No. 22, Jan. 18, 2002, 15 pages.
Ramanujapuram, et al., "Digital Content & Intellectual Property Rights: A Specification Language and Tools for Rights Management", Dec. 1998, 6 pages.
Ripley, et al., "Content Protection in the Digital Home", Intel Technology Journal, Nov. 2002, vol. 6, No. 4, pp. 49-56, 8 pages.
Rouvroy, et al., "Reconfigurable Hardware Solutions for the Digital Rights Management of Digital Cinema", Proceedings of the 4th ACM Workshop on Digital Rights Management, (Oct. 2004), pp. 40-53, 2 pages.
Royan, "Content Creation and Rights Management: Experiences of SCRAN", Program, 2000, 34(2), 10 pages.

(56) References Cited

OTHER PUBLICATIONS

Schneier, "Applied Cryptography Passage", Applied Crytography, Protocols, Algorithms and Source Code in C, 1996, pp. 183-187, retrieved Jun. 19, 2008, 13 pages.
Seok Kim, et al., "A Secure and Efficient Metering Scheme for Internet Advertising", Journal of KISS: Computer Systems and Theory, 2002, 29(3-4), pp. 153-160, 8 pages.
Shi, et al., "A Fast MPEG Video Encryption Algorithm", ACM Multimedia, 1998, Bristol, UK, pp. 81-88, 8 pages.
Sibert, et al., "Securing the Content, Not the Wire, for Information Commerce", pp. 1-12, Jul. 1995, 14 pages.
Sibert, et al., "The DigiBox: A Self-Protecting Container for Information Commerce", First Usenix Workshop on Electronic Commerce, pp. 171-183, Jul. 11-12, 1995, 14 pages.
Slusallek, et al., "Vision-An Architecture for Global Illumination Calculation", IEEE Transactions on Visualization and Computer Graphics, vol. 1, No. 1, Mar. 1995, pp. 77-96, 20 pages.
Smith, et al., "A New Set of Rules for Information Commerce", Electronic Commerce, pp. 34-35, Nov. 6, 1995, 2 pages.
Stallings, W., "Network and Internetwork Security Principles and Practice", 1995, Prentice-Hall, Inc., 3 pages.
Stefik, M., "Trusted Systems", Scientific American, www.sciam.com/0397/issue/0397stefik.html, Mar. 1997, retrieved on Sep. 9, 1998, 9 pages.
Stefik, M., "Shifting the Possible: How Trusted Systems and Digital Property Rights Challenge Us to Rethink Digital Publishing", Technical Perspective, pp. 137-159, 1997, 24 pages.
Steinebach, et al., "Digital Watermarking Basics—Applications—Limits", NFD Information—Wissenschaft and Praxis, Jul. 2002, vol. 53, pp. 261-268, 8 pages.
Stevens, M., "How Secure is your Computer System?", The Practical Accountant, vol. 31, No. 1, pp. 24-32, (Jan. 1998), 9 pages.
Tarter, J., "The Superdistribution Model", Soft Trends, 13(6), pp. 1-6, Nov. 15, 1996, 7 pages.
Thompson, et al., "Digital Licensing", IEEE Internet Computing, vol. 9, No. 4, (Jul./Aug. 2005), pp. 85-88, 4 pages.
Torrubia, et al., "Cryptography Regulations for E-Commerce and Digital Rights Management", Computers and Security, 2001, 20(8), pp. 724-738, 15 pages.
Valimaki, M. et al., "Digital Rights Management on Open and Semi-Open Networks", WIAPP, 2001, pp. 154-155, 3 pages.
Weber, R., "Digital Rights Management Technologies", IFRRO, Oct. 1995, 60 pages
White, S.R., et al., "Abyss: A Trusted Architecture for Software Protection", IEEE Symposium on Security and Privacy, pp. 38-51, Apr. 27-29, 1987, 16 pages.
White, S.R., et al., "Abyss: An Architecture for Software Protection", IEEE Trans. On Software Engineering, 16(6), pp. 619-629, Jun. 1990, 12 pages.
Yu, H., "Digital Multimedia at Home and Content Rights Management", IEEE Proceedings 2002 IEEE 4th International Workshop on Networked Appliances, 2002, pp. 49-56, 10 pages.
Zhao, et al., "A New Watermarking Scheme for Cad Engineering Drawings", 9th Intl. Conf. Computer-Aided Industrial Design and Conceptual Design, Nov. 22-25, 2008, pp. 518-522. 5 pages.
Zwollo, K., "Digital Document Delivery and Digital Rights Management", Information Services & Use, 2001, pp. 9-11, 3 pages.
Notice of Allowance and allowed claims mailed Jun. 12, 2013, from Korean Patent Application No. 10-2007-7013731. 5 Pages.
Notice of Allowance mailed Apr. 2, 2012, from U.S. Appl. No. 11/224,635. 7 Pages.
Notice of Allowance mailed Apr. 20, 2012, from U.S. Appl. No. 11/022,493. 8 Pages.
Notice of Allowance mailed Apr. 24, 2013, from U.S. Appl. No. 11/022,493. 8 Pages.
Notice of Allowance mailed Apr. 4, 2012, from U.S. Appl. No. 11/152,241. 8 Pages.
Notice of Allowance mailed Aug. 21, 2012, from U.S. Appl. No. 11/224,635. 7 Pages.
Notice of Allowance mailed Dec. 25, 2009, from Chinese Patent Application No. 200580038773.8. 4 Pages.
Notice of Allowance mailed Dec. 29, 2011, from U.S. Appl. No. 11/022,493. 9 Pages.
Notice of Allowance mailed Feb. 28, 2012, from Japanese Patent Application No. 2007-548385. 6 Pages.
Notice of Allowance mailed Jan. 22, 2013, from U.S. Appl. No. 11/022,493. 8 Pages.
Notice of Allowance mailed Jan. 24, 2012, from U.S. Appl. No. 11/147,539. 8 Pages.
Notice of Allowance mailed Jan. 29, 2010, from Chinese Patent Application No. 200580040764.2. 4 Pages.
Notice of Allowance mailed Jan. 29, 2015, from U.S. Appl. No. 13/711,549. 8 Pages.
Notice of Allowance mailed Jul. 20, 2012, from U.S. Appl. No. 11/022,493. 8 Pages.
Notice of Allowance mailed Jun. 6, 2014, from U.S. Appl. No. 11/227,045. 9 Pages.
Notice of Allowance mailed Mar. 29, 2013, from U.S. Appl. No. 11/227,045. 15 Pages.
Notice of Allowance mailed May 23, 2012, from U.S. Appl. No. 11/147,539. 9 Pages.
Notice of Allowance mailed May 29, 2013, from U.S. Appl. No. 11/227,045. 6 Pages.
Notice of Allowance mailed May 7, 2013, from Canadian Patent Application No. 2597231, 1 Page.
Notice of Allowance mailed Nov. 2, 2011, from U.S. Appl. No. 11/152,241. 10 Pages.
Notice of Allowance mailed Nov. 21, 2012, and English translation of claims on file, from Korean Patent Application No. 10-1213807. 4 Pages.
Notice of Allowance mailed Nov. 25, 2011, from U.S. Appl. No. 11/022,493. 11 Pages.
Notice of Allowance mailed Oct. 23, 2009, from Chinese Patent Application No. 2005-10113398.0. 4 Pages.
Notice of Allowance mailed Oct. 23, 2012, from U.S. Appl. No. 11/022,493. 7 Pages.
Notice of Allowance mailed Sep. 12, 2011, from U.S. Appl. No. 11/224,635. 8 Pages.
Notice of Allowance mailed Sep. 7, 2012, from U.S. Appl. No. 11/147,539. 9 Pages.
Notice of Allowance mailed Feb. 2, 2015, from U.S. Appl. No. 11/227,045. 8 Pages.
Notice of Allowance mailed Mar. 27, 2012, from Japanese Patent Application No. 2008-528054, 3 Pages.
Notice of Allowance mailed May 25, 2012, from U.S. Appl. No. 10/988,907. 8 Pages.
Advisory Action mailed Dec. 1, 2009, from U.S. Appl. No. 11/147,539. 3 Pages.
Advisory Action mailed Jan. 12, 2010, from U.S. Appl. No. 11/224,635. 2 Pages.
Advisory Action mailed Jan. 31, 2011, from U.S. Appl. No. 11/006,837. 3 Pages.
Advisory Action mailed Jul. 12, 2007, from U.S. Appl. No. 11/022,493. 3 Pages.
Advisory Action mailed Mar. 1, 2010, from U.S. Appl. No. 11/006,837. 3 Pages.
Amendment After Allowance filed Mar. 4, 2013, from U.S. Appl. No. 11/022,493. 6 Pages.
Amendment and Argument filed Sep. 10, 2012, from Japanese Patent Application No. 2005-301957. 9 Pages.
Amendment filed Nov. 12, 2008, in Japanese Patent Application No. 2007-541361. 4 Pages.
Amendment, Response, Claims and English Translation as filed Apr. 20, 2012, in Korean Patent Application No. 10-1201095. 28 Pages.
Amendment, Response, Claims and English Translation as filed Aug. 6, 2012, from Korean Patent Application No. 10-1213882. 18 Pages.
Applicant Initiated Interview Summary mailed Mar. 27, 2013, from U.S. Appl. No. 11/227,045. 3 Pages.
Applicant Initiated Interview Summary mailed Jan. 29, 2013, from U.S. Appl. No. 11/227,045. 2 Pages.
Applicant Initiated Interview Summary mailed Nov. 18, 2011, from U.S. Appl. No. 11/022,493. 3 Pages.

(56) References Cited

OTHER PUBLICATIONS

Applicants Summary of Interview filed Mar. 1, 2011, from U.S. Appl. No. 11/006,837. 1 Pages.
Argument and Amendment filed Sep. 6, 2011, from Japanese Patent Application No. 2005-330496. 6 Pages.
Argument and Claims as filed Nov. 4, 2011, from Japanese Patent Application No. 5173436. 7 Pages.
Argument, Amendment and Claims as filed Nov. 21, 2012, from Japanese Patent Application No. 5173436. 2 Pages.
Comments in Preparation of Oral Hearing filed Jan. 16, 2008, from European Patent Application No. 05110697.9. 24 Pages.
Decision on Grant of Patent mailed May 5, 2010, from Russian Patent Application No. 2005131911. 7 Pages.
Decision on Rejection mailed Sep. 13, 2010, from Chinese Patent Application No. 200680030846.3. 5 Pages.
Decision to Refuse mailed Feb. 15, 2008, from European Patent Application No. 05110697.9. 45 Pages.
Examination Report mailed Apr. 5, 2007, from European Patent Application No. 05110697. 5 Pages.
Examination Report mailed Jan. 4, 2013, from Canadian Patent Application No. 2597231, 4 Pages.
Examination Report mailed Nov. 17, 2006, from European Patent Application No. 05110697.9. 6 Pages.
Examiner Initiated Interview Summary mailed Sep. 30, 2013, from U.S. Appl. No. 11/227,045. 1 Page.
Examiner Interview Summary Record dated Aug. 10, 2011, from U.S. Appl. No. 11/152,214. 4 Pages.
Examiner Interview Summary Record mailed Dec. 20, 2006, from U.S. Appl. No. 11/022,493. 3 Pages.
Examiner Interview Summary Record mailed Dec. 24, 2009, from U.S. Appl. No. 11/227,045. 3 Pages.
Examiner Interview Summary Record mailed Jan. 23, 2008, from U.S. Appl. No. 11/022,493. 3 Pages.
Notice of Allowance Mailed May 1, 2012 From Japanese Patent Application No. 2008-528054.
First Examination Report Mailed Nov. 20, 2014 From India Patent Application No. 3039/DEL/2005.
Office Action Mailed Dec. 3, 2010 From Mexican Patent Application No. MX/a/2007/005655.
First Examination Report Mailed Feb. 6, 2015 From India Patent Application No. 3407/DELNP/2007.
First Examination Report Mailed Nov. 5, 2014 From India Patent Application No. 3411/DELNP/2007.
Response to Office Action Filed Jan. 28, 2015 From India Patent Application No. 2739/DEL/2005.
First Examination Report Mailed Dec. 15, 2014 From India Patent Application No. 4041/DELNP/2007.
First Office Action Mailed Sep. 21, 2011 From Chinese Patent Application No. 200680030846.3.
First Examination Report Mailed Oct. 31, 2014 From India Patent Application No. 3410/DELNP/2007.
Office Action Mailed Feb. 7, 2007 From U.S. Appl. No. 11/034,377.
Notice of Allowance Mailed Nov. 3, 2010 From Chinese Patent Application No. 200680006199.2.
First Examination Report mailed Jun. 29, 2015 from Indian Patent Application No. 5036/DELNP/2007, 2 pages.
Response filed Jul. 7, 2015 from Indian Patent Application No. 3408/DELNP/2007, 23 pages.
Final Office Action mailed Nov. 7, 2005, from U.S. Appl. No. 09/290,363. 8 Pages.
Final Rejection and English translation mailed Jul. 5, 2012, from Korean Patent Application No. 10-1213807. 5 Pages.
Final Rejection mailed Jan. 17, 2012, from Japanese Patent Application No. 5173436. 8 Pages.
First Examination Report mailed Mar. 31, 2015, from Indian Patent Application No. 3408/DEL/2007. 2 Pages.
First Examination Report mailed Nov. 6, 2014, from Indian Patent Application No. 3418/DELNP/2007. 1 Page.
First Examination Report mailed Oct. 27, 2014, from Indian Patent Application No. 3406/DELNP/2007. 1 Page.
First Office Action mailed Apr. 11, 2008, from Chinese Patent Application No. 200580038813.9. 11 Pages.
First Office Action mailed Dec. 12, 2008, from Chinese Patent Application No. 2005-10113398.0. 15 Pages.
First Office Action mailed Dec. 29, 2010, from Chinese Patent Application No. 200580044294.7. 9 Pages.
International Search Report and Written Opinion mailed Aug. 2, 2007, from PCT Patent Application No. PCT/US05/30489. 9 Pages.
International Search Report and Written Opinion mailed May 2, 2008, from PCT Patent Application No. PCT/US05/40940. 12 Pages.
International Search Report and Written Opinion mailed Oct. 23, 2007, from PCT Patent Application No. PCT/US06/10664. 9 Pages.
International Search Report and Written Opinion mailed Sep. 29, 2008, from PCT Patent Application No. PCT/US05/40940. 11 Pages.
International Search Report mailed Jul. 22, 2002, from PCT Patent Application No. PCT/US00/04949. 4 Pages.
International Search Report mailed Jul. 24, 2002, from PCT Patent Application No. PCT/US00/04946. 5 Pages.
International Search Report mailed Jul. 24, 2002, from PCT Patent Application No. PCT/US00/04948. 5 Pages.
International Search Report mailed Jul. 26, 2002, from PCT Patent Application No. PCT/US00/05091. 5 Pages.
International Search Report mailed Jul. 30, 2002, from PCT Patent Application No. PCT/US00/04983. 5 Pages.
International Search Report mailed Sep. 18, 2007, from PCT Patent Application No. PCT/US05/30490. 3 Pages.
Non-Final Office Action mailed Apr. 21, 2011, from U.S. Appl. No. 11/224,635. 10 Pages.
Non-Final Office Action mailed Aug. 25, 2009, from U.S. Appl. No. 11/227,045. 13 Pages.
Non-Final Office Action mailed Aug. 5, 2010, from U.S. Appl. No. 10/988,907. 6 Pages.
Non-Final Office Action mailed Dec. 12, 2011, from U.S. Appl. No. 10/988,907. 8 Pages.
Non-Final Office Action mailed Feb. 18, 2009, from U.S. Appl. No. 11/147,539. 16 Pages.
Non-Final Office Action mailed Jul. 21, 2010, from U.S. Appl. No. 11/147,539. 24 Pages.
Non-Final Office Action mailed Jun. 9, 2011, from U.S. Appl. No. 11/152,214. 21 Pages.
Non-Final Office Action mailed Mar. 23, 2010, from U.S. Appl. No. 11/224,635. 4 Pages.
Non-Final Office Action mailed Mar. 4, 2010, from U.S. Appl. No. 10/988,907. 7 Pages.
Non-Final Office Action mailed May 5, 2009, from U.S. Appl. No. 11/224,635. 9 Pages.
Non-Final Office Action mailed Nov. 14, 2007, from U.S. Appl. No. 11/022,493. 9 Pages.
Response, Amendment, Summarized Translation, Claims as filed Aug. 17, 2012, from Korean Patent Application No. 10-2007-7013731. 22 Pages.
Response, Amendment, Summarized Translation, Claims as filed Sep. 3, 2012, from Korean Patent Application No. 10-1213807. 18 Pages.
Restriction Requirement mailed Mar. 24, 2009, from U.S. Appl. No. 11/224,635. 6 Pages.
Restriction Requirement mailed Nov. 12, 2008, from U.S. Appl. No. 10/988,907. 6 Pages.
Restriction Requirement mailed Jan. 22, 2009, from U.S. Appl. No. 11/022,493. 7 Pages.
Result of Consultation mailed Jan. 10, 2008, from European Patent Application No. 05110697.9. 6 Pages.
Rule 70(2) mailed Jan. 25, 2011, from European Patent Application No. 5821183. 1 Page.
Search Report mailed Aug. 13, 2010, from European Patent Application No. 5823253.9. 7 Pages.
Search Report mailed Nov. 17, 2008, from European Patent Application No. 05824535.8. 5 Pages.
Second Office Action mailed Apr. 13, 2011, from Chinese Patent Application No. 200810189718.4. 6 Pages.
Second Office Action mailed Apr. 2, 2011, from Chinese Patent Application No. 200810189719.9. 6 Pages.

(56) References Cited

OTHER PUBLICATIONS

Second Office Action mailed Jul. 3, 2009, from Chinese Patent Application No. 2005-10113398.0. 7 Pages.
Second Office Action mailed Jun. 7, 2010, from Chinese Patent Application No. 200680030846.3. 6 Pages.
Second Office Action mailed Mar. 4, 2013, from Chinese Patent Application No. 200580044294.7. 7 Pages.
Substantiation of the Appeal filed Jun. 25, 2008, from European Patent Application No. 05110697.9. 38 Pages.
Summons to Attend Oral Hearing mailed Sep. 27, 2007, from European Patent Application No. 05110697.9. 33 Pages.
Supplemental Amendment filed Apr. 22, 2015, from U.S. Appl. No. 13/711,549. 8 pages.
Supplementary European Search Report mailed Sep. 19, 2011, from European Patent Application No. 05855148.2. 1 Page.
Voluntary Amendment and English Translation of the Claims filed Feb. 23, 2011, from Korean Patent Application No. 10-1213882. 7 Pages.
Voluntary Amendment, Amended Claims and English translation of Amended Claims as filed Sep. 17, 2009, from Chinese Patent Application No. 200580044294.7. 11 Pages.
Written Appeal and Amendment filed May 16, 2012, from Japanese Patent Application No. 5173436. 6 Pages.
Written Opinion mailed Dec. 26, 2008, from PCT Patent Application No. PCT/US2008/067466. 4 Pages.
Written Opinion mailed Sep. 18, 2007, from PCT Patent Application No. PCT/US05/30490. 7 Pages.
Preliminary Amendment filed Feb. 6, 2012, from U.S. Appl. No. 13/367,198. 8 Pages.
Terminal Disclaimer Review Decision mailed Jul. 11, 2013, from U.S. Appl. No. 13/367,198. 1 Page.
Terminal Disclaimer filed Jul. 9, 2013, from U.S. Appl. No. 13/367,198. 2 Pages.
Response filed Jun. 3, 2014, from U.S. Appl. No. 13/367,198. 14 Pages.
Response filed Sep. 9, 2015 from the Indian Patent Application No. 3407/DELNP/2007, 20 pages.
Response filed Sep. 30, 2015 from Indian Patent Application No. 4041/DELNP/2007, 16 Pages.
Examination Report mailed Oct. 30, 2015 from Indian Patent Application No. 02124/DELNP/2008, 2 Pages.

* cited by examiner

TUNING PRODUCT POLICY USING OBSERVED EVIDENCE OF CUSTOMER BEHAVIOR

CROSS-REFERENCE TO RELATED APPLICATIONS

This patent application is a divisional of, and claims priority to, U.S. patent application Ser. No. 11/224,635, filed on Sep. 12, 2005, which is a continuation-in-part of U.S. patent application Ser. No. 11/152,214, filed Jun. 14, 2005, now U.S. Pat. No. 8,176,564, which is a continuation-in-part of U.S. patent application Ser. No. 11/022,493, filed Dec. 22, 2004, which is a continuation-in-part of U.S. patent application Ser. No. 11/006,837, filed Dec. 8, 2004, which is a continuation-in-part of U.S. patent application Ser. No. 10/989,122, filed Nov. 15, 2004, now U.S. Pat. No. 7,610,631, all of which are incorporated herein by reference in their entirety.

BACKGROUND

Systems for managing financial risk have taken many forms. Credit card companies routinely monitor transactions watching for fraudulent behavior. Credit limits are based on past performance with respect to spending and bill payment. Individuals and companies with good credit histories may be afforded higher credit limits and more lenient policies with respect to use of a credit line. In many of these cases, each transaction is analyzed and approved on a transaction by transaction basis. Further, in many instances the actual financial instrument is relatively inexpensive, for example, a plastic credit card may cost less than a dime. In other instances, for example, a cellular telephone system, the cellular phone may have some value but may be rendered essentially useless when access to the network is denied.

However, in the case of a pay-per-use or pay-as-you-go computer, the asset, that is the computer, has high value and may offer valuable functionality even when disconnected from a network. Analyzing, measuring, and controlling risk on such a platform presents unique challenges to risk management.

SUMMARY

Data related to operation of a pay-per-use or pay-as-you-go computer may be gathered from the computer itself and from data related to financial transactions and other credit-related information. Using this information, policies may be developed specifying how closely to monitor operation of the computer for fraudulent activity as well as setting the level of response to suspected fraudulent activity. Monitoring the operation of the computer may involve not only what measurements to take, but how often to take the measurements. Taking too many measurements may affect computer performance and lower user satisfaction with the computing experience. Under-measuring may increase the risk to an underwriter from loss due to fraudulent activity. By setting the policy based on the user's observed behavior, using either data gathered at the computer, financial transaction records, or both, a balance may be achieved.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time; current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
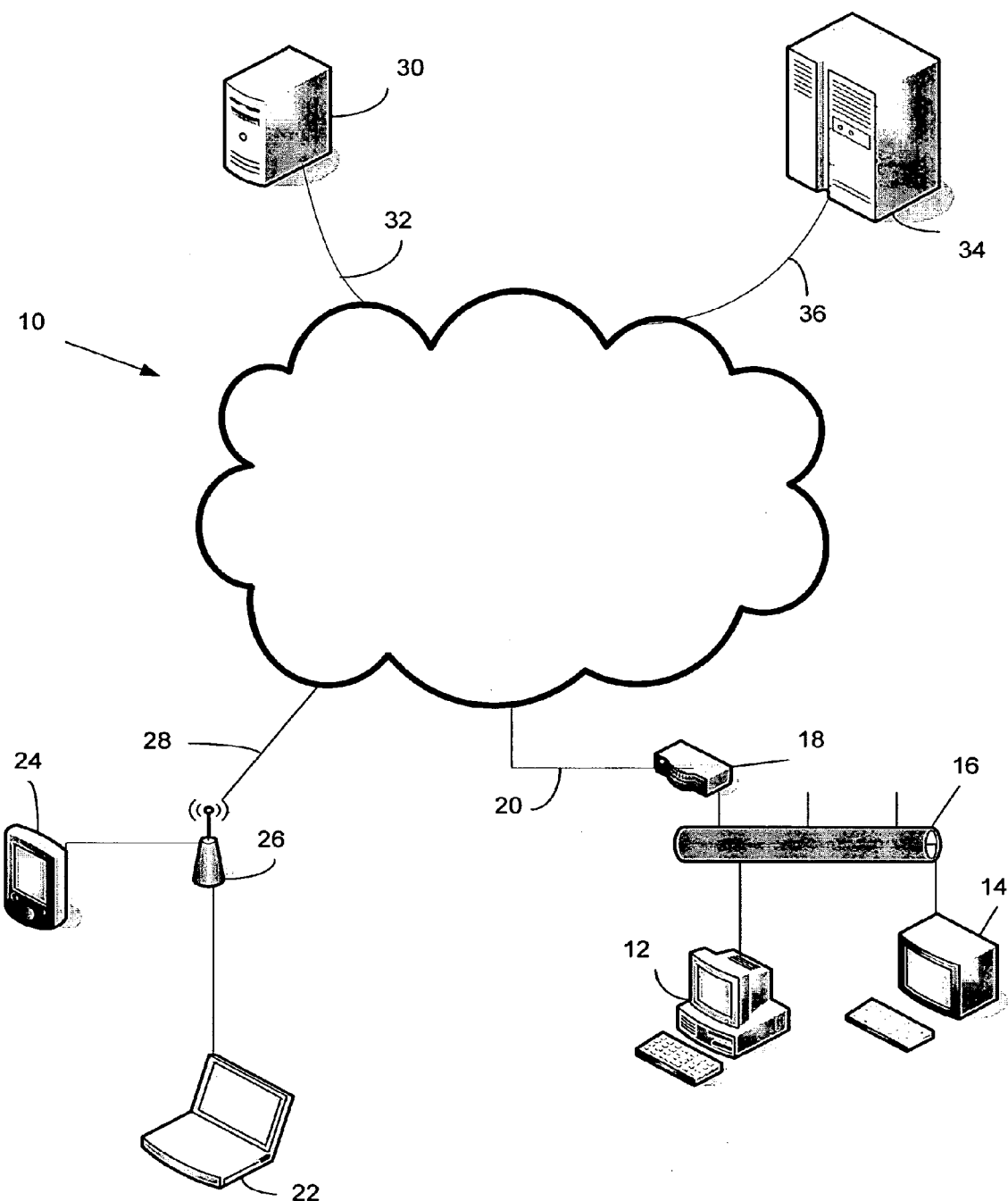
FIG. 1 is a simplified and representative block diagram of a computer network.

FIG. 1 illustrates a network 10 that may be used to implement a pay-per-use computer system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

In the case of a pay-per-use or pay-as-you-go model, the elements of FIG. 1 may be used to illustrate system components. Metered devices, that is, pay-per-use or pay-as-you-go hardware and/or software, may be represented by personal computer 12, laptop computer 22, personal data assistant 24, or server 30. The mainframe 34, or one or more servers 30 may represent the infrastructure side of the system, for example, clearinghouse functions, payment system functions, or provisioning system functions, etc.

Figure 2:
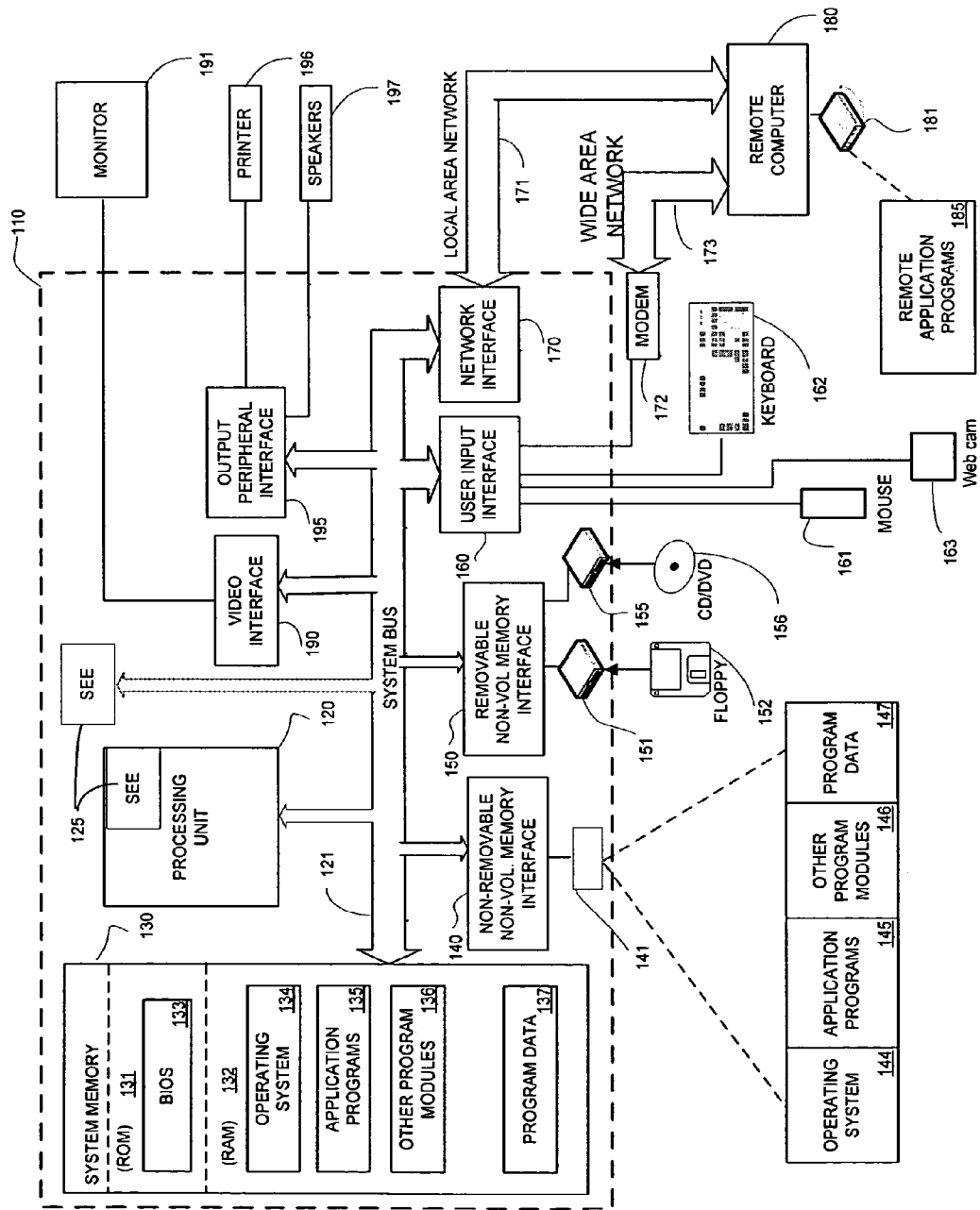
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The processing unit 120 may also include a secure execution environment 125. In another embodiment, the secure execution environment 125 may be a standalone component, as shown by the dashed lines of FIG. 2. The secure execution environment 125 and its interaction with the processing unit 120, or equivalent devices, is discussed in more detail below with respect to FIG. 3 and FIG. 4.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
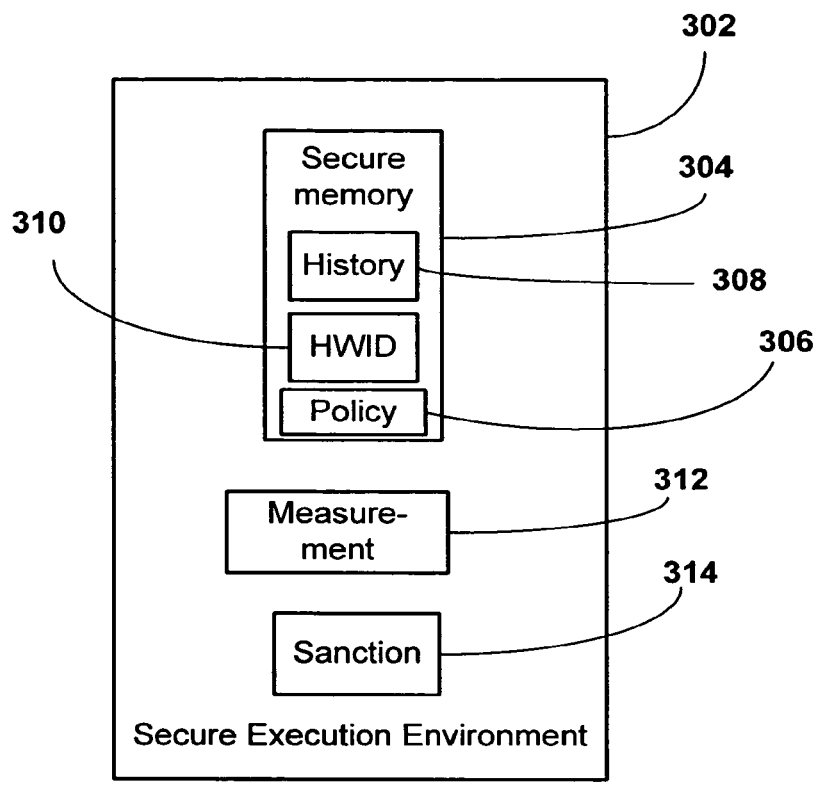
FIG. 3 is a block diagram of a computer showing details of a secure execution environment and its relationship to other functional elements of the computer.

FIG. 3 is a block diagram of a secure execution environment 302, the same as, or similar to, the secure execution environment 125 of FIG. 2. The secure execution environment 302 include a secure memory 304. Secure memory 304 may be used to store data, executable programs, cryptographic keys, or other information in a secure, tamper-resistant manner. Specifically, the secure memory 304 may store policy information 306, history data 308 corresponding to previous measurements and/or sanction activity, and a hardware identifier 310 used to identify the computer 110.

The secure execution environment 302 may include a measurement circuit 312 and a sanction circuit 314. The measurement circuit 312 may be used to gather data about the operation of the computer 110, particularly as it relates to conformance to the policy 306. The sanction circuit 314 may be invoked when it is determined that the computer 110 is not operating in conformance to the policy 306. The nature and severity of sanctions may be determined by the policy 306. The measurement circuit 312 and the sanction circuit 314 may also be implemented in software and executed by the processing unit 120.

Figure 4:
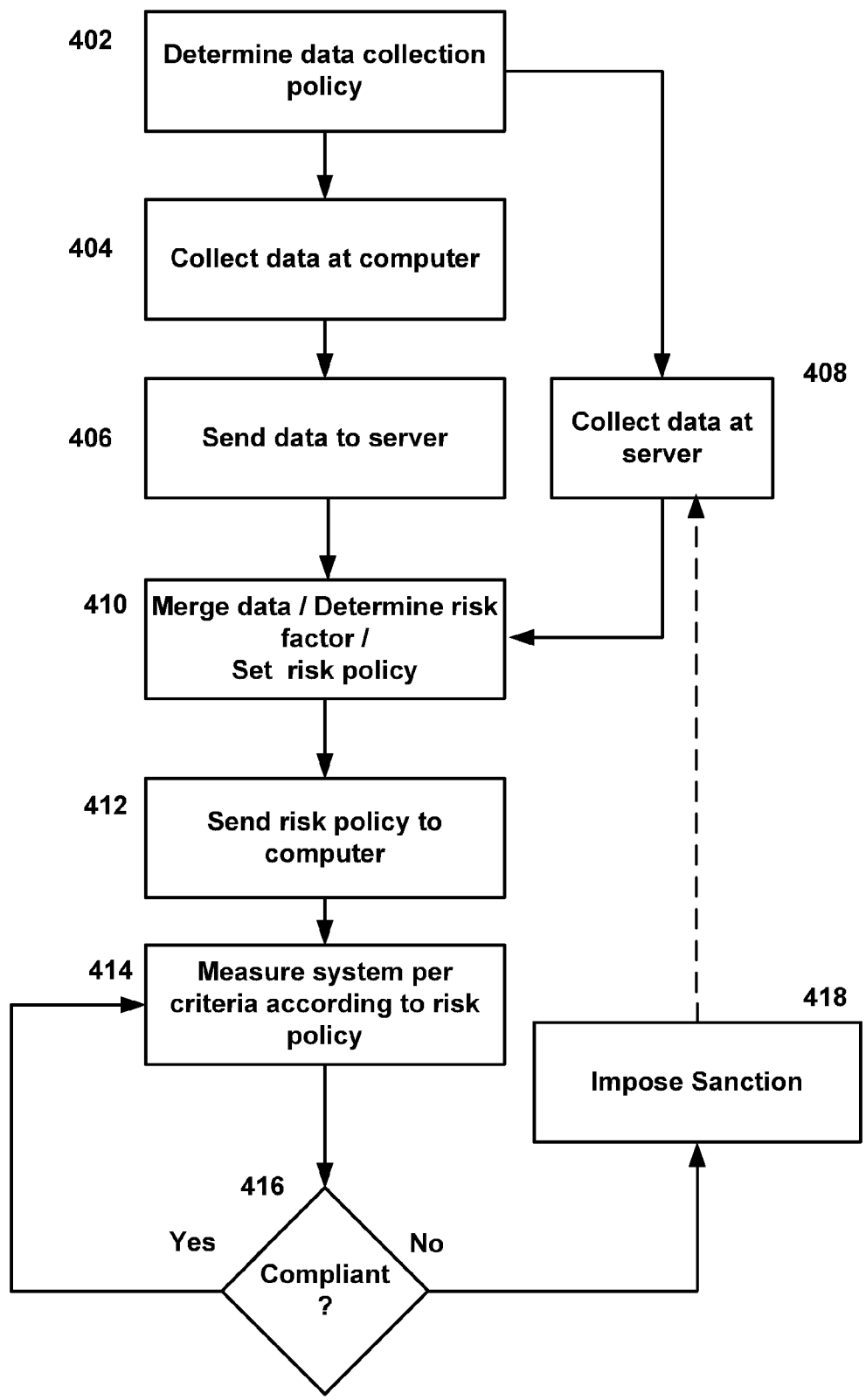
FIG. 4 a flow chart depicting a method of tuning product policy based on observed user behavior.

FIG. 4, a flow chart of a method of tuning product policy, is discussed and described. A data collection policy may be determined at block 402. The data collection policy pertains to those measurements that will be used for tuning the policy and in turn setting operational measurements for measuring compliance to an operating policy. The data collection policy may be a default or a policy initially installed prior to delivery to the end-user.

Measurements may then be taken at block 404 to collect data at the computer according to the data collection policy of block 402. The data collected, for use in determining a risk factor, may include component verification, metering activity, clock, verification, previous enforcement action, provisioning packet activity, and application usage. Component verification may include measurements to ensure that certain elements of the computer are present and operating properly, for example peripheral units may be bound to the computer 110 as part of a package. Data collected with respect to metering activity may analyze patterns of metering and duration of metering to determine if they fall within normal or historical usage patterns and if they match other measurements such as application usage. A history of provisioning packet receipt may also be used to determine risk. For example, application usage should not greatly exceed metering, nor should metering greatly exceed value corresponding to provisioning packet downloads.

The collected data may be analyzed locally and results sent to a server, such as server 30 of FIG. 1, at block 406. Alternatively, the raw data may be sent to a server at block 406 with the analysis done at the server.

The data collection policy at block 402 may also specify data to be collected by the server 30 at block 408. Data collected at the server may include commercially available credit data, local data corresponding to payment history, history data about previous sanctions, customer service data such as contact with a support center, and the like.

The data collected both at the computer 110 and at the server may be merged, if both are used, at block 410 and further analyzed to determine a risk factor. The risk factor may then be used to set a risk policy. In one embodiment, the risk factor directly corresponds to a policy, while in another embodiment the risk factor may be used to select from predetermined policies. The policy, or a policy identifier, may be sent to the computer 110 at block 412. The policy may be coded as an XML schema. The policy may be signed or signed and encrypted so that fraudulent policies are not accepted by the computer 110.

In one embodiment, the risk factor or related data may be programmatically exposed, for example, using an application program interface, for sharing with other entities. In some target markets, the risk factor or related data may be the only financial history or record of responsibility available for a user. The risk factor generated by use of the computer 110 may be a valuable first step in developing a recognition of fiscal responsibility and provide a standardized way of quantifying such information. Making such data available, especially programmatically, may be a valuable side effect of the measurements and calculation of risk factor.

When the policy has been verified and installed the computer 110 may resume operation using the updated policy. As discussed above, the policy may include setting criteria for measuring compliance with the policy and may include collection of data corresponding to a periodic signal from the operating system, e.g. an operating system heartbeat. The operating system heartbeat may be a regular signal, in some embodiments, a signed signal, indicating that an approved, valid version of the operating system is running. Other measurements may include some of those taken previously, as well as others, depending on the policy, such as verification of designated files or components, monitoring a system clock for tampering, verification of standard operating modes, frequency and type of memory access, and continued comparison of time between provisioning cycles and metered usage. Measurements may be taken and data stored by the secure execution environment 125.

The measurement data may be analyzed to determine compliance with the policy at block 416. If the measurement data indicates compliance with the policy the yes branch from block 416 may be taken to block 414 and in more measurement data may be collected.

When an analysis of the measurement data at block 416 indicates noncompliance with the policy, the no branch may be taken and a sanction imposed at block 418. Depending on the settings of the policy, a range of sanctions may be imposed, as discussed above, ranging from a warning to disabling the computer 110.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope, of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A server comprising:
   at least one processing unit; and
   at least one computer-readable media storing computer-executable instructions which, when executed by the at least one processing unit, cause the server to:
      acquire operational data reflecting operation of a computer;
      set policy information for the computer based on the acquired operational data; and
      send the policy information from the server to the computer,
      wherein the policy information sent from the server to the computer causes the computer to impose a sanction on the computer for non-compliance with the policy information, and
      wherein the computer comprises a sanction circuit in a secure execution environment and the policy information directs the sanction circuit to impose the sanction.

2. The server of claim 1, wherein the operational data is received from the computer.

3. The server of claim 1, wherein the computer-executable instructions, when executed by the at least one processing unit, cause the server to:
   encrypt the policy information before sending the policy information to the computer.

4. The server of claim 1, wherein the sanction at least partially disables the computer.

5. The server of claim 1, wherein the computer-executable instructions, when executed by the at least one processing unit, cause the server to:
   collect financial history information associated with a user of the computer; and
   set the policy information based on the financial history information.

6. The server of claim 1, wherein the policy information includes criteria for measuring compliance with a policy defined by the policy information.

7. The server of claim 1, wherein the sanction comprises a warning provided on the computer.

8. A computer comprising:
   at least one processing unit;
   a secure execution environment;
   a sanction circuit in the secure execution environment; and
   at least one computer-readable media storing computer-executable instructions which, when executed by the at least one processing unit, cause the at least one processing unit to:
      acquire operational data reflecting operation of the computer;
      provide the operational data to a server that sets policy information for the computer based on the operational data; and
      receive the policy information from the server,
   wherein the sanction circuit in the secure execution environment is configured to impose a sanction on the computer based on the policy information received from the server.

9. The computer of claim 8, wherein the secure execution environment is part of the at least one processing unit.

10. The computer of claim 8, wherein the sanction circuit is implemented as software.

11. The computer of claim 10, wherein the sanction circuit is executed by the at least one processing unit.

12. The computer of claim 8, wherein the secure execution environment is a standalone component separate from the at least one processing unit.

13. The computer of claim 8, further comprising a measurement circuit configured to perform measurements on the computer to obtain the operational data.

14. The computer of claim 13, wherein the measurement circuit is configured to adjust how the measurements are performed based on the policy information.

15. The computer of claim 14, wherein the measurement circuit is implemented as software executed by the at least one processing unit.

16. The computer of claim 8, wherein the computer is a metered-use computer.

17. A method performed by at least one computer processing unit, the method comprising:
   acquiring operational data reflecting operation of a computer;
   setting policy information for the computer based on the acquired operational data; and
   providing the policy information to the computer,
   wherein the policy information provided to the computer causes a sanction circuit in a secure execution environment on the computer to impose a sanction on the computer for non-compliance with the policy information, and
   wherein the policy information includes criteria for imposing the sanction based on at least one of:
      clock verification by the secure execution environment on the computer, or
      component verification by the secure execution environment on the computer, wherein the component verification verifies that certain elements of the computer are present and operating properly.

18. The method of claim 17, wherein the policy information comprises a data collection policy that causes the computer to obtain subsequent operational data in accordance with the data collection policy.

19. The method of claim 18, wherein the data collection policy controls a measurement circuit embodied in the secure execution environment of the computer.

20. The method of claim 17, wherein the criteria for imposing the sanction is based on the clock verification by the secure execution environment on the computer.

21. The method of claim 17, wherein the criteria for imposing the sanction is based on the component verification by the secure execution environment on the computer.

* * * * *